US012621139B2

(12) United States Patent
Bhandaru et al.

(10) Patent No.: US 12,621,139 B2
(45) Date of Patent: May 5, 2026

(54) MAC HEADER PROTECTION WITH PREEXISTING KEYS

(71) Applicant: Avago Technologies International Sales Pte. Limited, Singapore (SG)

(72) Inventors: Nehru Bhandaru, San Jose, CA (US); Thomas Derham, San Diego, CA (US); Wentong Chen, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 80 days.

(21) Appl. No.: 18/643,482

(22) Filed: Apr. 23, 2024

(65) Prior Publication Data

US 2025/0167993 A1    May 22, 2025

Related U.S. Application Data

(60) Provisional application No. 63/601,438, filed on Nov. 21, 2023, provisional application No. 63/558,838, filed on Feb. 28, 2024, provisional application No. 63/563,092, filed on Mar. 8, 2024.

(51) Int. Cl.
| | |
|---|---|
| *H04L 29/06* | (2006.01) |
| *H04L 9/06* | (2006.01) |
| *H04L 9/08* | (2006.01) |

(52) U.S. Cl.
CPC ............ *H04L 9/088* (2013.01); *H04L 9/0631* (2013.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 2009/0228700 A1* | 9/2009 | Hubbell | ............... | H04L 9/3297 |
| | | | | 713/153 |
| 2011/0055558 A1* | 3/2011 | Liu | ........................ | H04L 9/0637 |
| | | | | 713/160 |
| 2013/0173924 A1 | 7/2013 | Kim et al. | | |
| 2021/0149824 A1 | 5/2021 | Satpathy et al. | | |

OTHER PUBLICATIONS

Extended European Search Report on Appln. No. 24209403.5 dated Mar. 9, 2025.

* cited by examiner

*Primary Examiner* — Andrew J Steinle
(74) *Attorney, Agent, or Firm* — Foley & Lardner LLP

(57) ABSTRACT

The technical solutions are directed to MAC address protection for frame integrity verification. A sender device can compute, using a temporal key (TK) programmed in hardware, a first key for a body of a frame and a second key for a header of the frame, different from the first key. The sender can encrypt the body of the frame at a machine access control (MAC) layer using the first key and the header of the frame at the MAC layer using the second key. The sender can compute a first MIC of the encrypted frame using the first key and a second MIC of a content of the header at the MAC layer using the second key. The sender can transmit the frame with the first MIC and the second MIC to a receiver configured to determine integrity of the header of the frame based on the second MIC.

20 Claims, 9 Drawing Sheets

700

700

MAC HEADER PROTECTION WITH PREEXISTING KEYS

CROSS-REFERENCE TO RELATED PATENT APPLICATIONS

This application claims the benefit of and priority to a U.S. Provisional Application No. 63/601,438, filed Nov. 21, 2023, a U.S. Provisional Application No. 63/558,838, filed Feb. 28, 2024, and a U.S. Provisional Application No. 63/563,092, filed Mar. 8, 2024, all of which are incorporated herein by reference in their entirety.

TECHNICAL FIELD

This disclosure generally relates to systems and methods for network traffic protection, including for example protection of MAC headers.

BACKGROUND

When exchanging network communications, network devices can use Media Access Control (MAC) addresses to identify or distinguish devices engaged in communications. In various network communication, devices can use MAC addresses to route data to their intended destinations.

SUMMARY

Technical solutions provided herein are directed to providing security and integrity to machine access control (MAC) headers in wireless communication frames. In wireless communications, MAC header can be subject to tampering or unauthorized access by adversaries that may intercept network packets and change MAC header data. The technical solutions use a hardware programmed temporal key (TK) to derive separate keys for the body and header of communication frames at the MAC layer, improving the network packet integrity in a compute efficient manner. For example, in scenarios in which wireless devices exchange sensitive information over a network, MAC header data of any intercepted network packets may be manipulated to gain unauthorized access to a system. The technical solutions provide compute-efficient and secure techniques to protect MAC headers using existing system and network infrastructure, thereby mitigating the risk of unauthorized access or data manipulation without added design complexity.

An aspect of the technical solutions is directed to a system. The system can include one or more processors coupled with memory. The one or more processors can be configured to compute, using a temporal key (TK) programmed in hardware, a first key for a body of a frame and a second key for a header of the frame, the second key different from the first key. The one or more processors can be configured to encrypt the body of the frame at a machine access control (MAC) layer using the first key and the header of the frame at the MAC layer using the second key. The one or more processors can be configured to compute a first message integrity code (MIC) of the encrypted frame using the first key and a second MIC of a content of the header of the frame at the MAC layer using the second key. The one or more processors can be configured to transmit the frame with the first MIC and the second MIC to a receiver, the receiver configured to determine integrity of the header of the frame based at least on the second MIC.

The one or more processors can be configured to generate a combined MIC from the first MIC and the second MIC. The one or more processors can be configured to transmit the combined MIC to the receiver to determine the integrity of the frame. The combined MIC can be generated using one of: a concatenation of the first MIC and the second MIC, a bitwise exclusive OR (XOR) computation applied to the first MIC and the second MIC, or any reversable computation applied to the first MIC and the second MIC.

The one or more processors can be configured to compute the first key using a hash-based message authentication code (HMAC) operation with a first input of the TK and a first fixed pattern. The one or more processors can be configured to computing the second key using the HMAC operation with a second input of the TK and a second fixed pattern. The first fixed pattern can include a packet number (PN) of a network packet of the frame and the second fixed pattern includes one or more characters of the body. The encryption of the body of the frame at the MAC layer using the first key can be performed concurrently with the encryption of the header of the frame at the MAC layer using the second key.

The frame can correspond to a first network packet of a plurality of network packets. The first network packet can include a first packet number in the header of the frame. The one or more processors can be configured to determine to resend the first network packet as a second network packet having a second packet number in a second header of a second frame of the second network packet. The second packet number can be different than the first packet number. The one or more processors can be configured to compute, using the TK, a first key for a second body of the second frame of the second network packet and a second key for the second header of the second frame. The first key of the first network packet can be different than the first key of the second network packet.

The first key for the second body of the second frame of the second network packet can be same as the first key for the body of the frame of the first network packet. The one or more processors can be configured to identify one or more frames at the MAC layer to be encrypted for wireless communications. The one or more processors can be configured to encrypt the second frame of the second network packet at the MAC layer using the first key of the second body and the second key for the second header.

The one or more processors can be configured to determine, during an exchange over a wireless network between a device comprising the one or more processors and a receiver, a pairwise master key (PMK). The one or more processors can be configured to generate the temporal key (TK) using the PMK. The receiver can be configured to determine the integrity of the header based on a verification of integrity of the header using the second MIC prior to decrypting the frame.

The one or more processors can be configured to include the second MIC in the header of the frame and transmit the frame with the second MIC included in the header of the frame. The one or more processors can be configured to compute at least one the first key or the second key using an Advanced Encryption Standard (AES) algorithm and at least one of the first MIC or the second MIC using at least one of a Cipher Block Chaining-MAC Protocol (CCMP) or a Galois/Counter Mode Protocol (GCMP). The receiver can be configured to verify the integrity of the header of the frame using the second MIC prior to processing the body of the frame.

An aspect of the technical solutions is directed to a method. The method can be a method for providing protection of a machine access control (MAC) header of a frame. The method can include identifying, by one or more processors, a temporal key (TK) programmed in hardware to encrypt frames at a machine access control (MAC) layer for wireless communications. The method can include computing, by the one or more processors using the TK, a first key for encrypting a body of a frame and a second key for encrypting a header of the frame, the second key different from the first key. The method can include identifying, by the one or more processors, one or more frames at the MAC layer to be encrypted for wireless communications. The method can include encrypting, by the one or more processors, the body of the one or more frames at the MAC layer using the first key and the header of the one or more frames at the MAC layer using the second key.

The method can include computing the first key using a hash-based message authentication code (HMAC) operation with a first input of the TK and a first fixed pattern. The method can include computing the second key using the HMAC operation with a second input of the TK and a second fixed pattern. The first fixed pattern can include a packet number (PN) of a network packet of the frame and the second fixed pattern includes one or more characters of the body.

The frame can correspond to a first network packet of a plurality of network packets, the first network packet including a first packet number in the header of the frame. The method can include determining, by the one or more processors, to resend the first network packet as a second network packet having a second packet number in a second header of a second frame of the second network packet. The second packet number can be different than the first packet number. The method can include computing, by the one or more processors using the TK, a first key for a second body of the second frame of the second network packet and a second key for the second header of the second frame. The first key of the first network packet can be different than the first key of the second network packet. The first key for the second body of the second frame of the second network packet can be same as the first key for the body of the frame of the first network packet. The method can include identifying, by the one or more processors, one or more frames at MAC layer to be encrypted for wireless communications. The method can include encrypting, by the one or more processors, the second frame of the second network packet at the MAC layer using the first key of the second body and the second key for the second header.

The method can include computing the first key for the body using an advanced encryption standard (AES) operation with a first input of the TK and a first fixed pattern and computing the second key for the header of the frame using the same AES operation with a second input of the TK and a second fixed pattern. The method can include computing the second key for the header using the AES operation with a first input of the TK and a first fixed pattern and using the TK as the first key for the body of the frame.

The encryption of the one or more frames can include applying Cipher-based Message Authentication Code (CMAC) or Galois/Counter Code (GMAC) techniques in conjunction with Advanced Encryption Standard (AES) encryption. The method can include selecting between the CMAC and GMAC techniques based on at least one of settings for security of the wireless communications or conditions of a network for the wireless communications. The method can include generating an initialization vector (IV) for encryption based on a parameter of the frame and using the IV to encrypt the body of the frame.

An aspect of the technical solution is directed to a system. The system can include one or more processors coupled with memory and configured to identify a temporal key (TK) programmed in hardware to encrypt frames at a machine access control (MAC) layer for wireless communications. The one or more processors can be configured to compute, using the TK, a first key for encrypting a body of a frame and a second key for encrypting a header of the frame, the second key different from the first key. The one or more processors can be configured to identify one or more frames at the MAC layer to be encrypted for wireless communications. The one or more processors can be configured to encrypt the body of the one or more frames at the MAC layer using the first key and the header of the one or more frames at the MAC layer using the second key.

BRIEF DESCRIPTION OF THE DRAWINGS

These and other aspects and features of the present embodiments will become apparent to those ordinarily skilled in the art upon review of the following description of specific embodiments in conjunction with the accompanying figures.

DETAILED DESCRIPTION

Figure 1A:
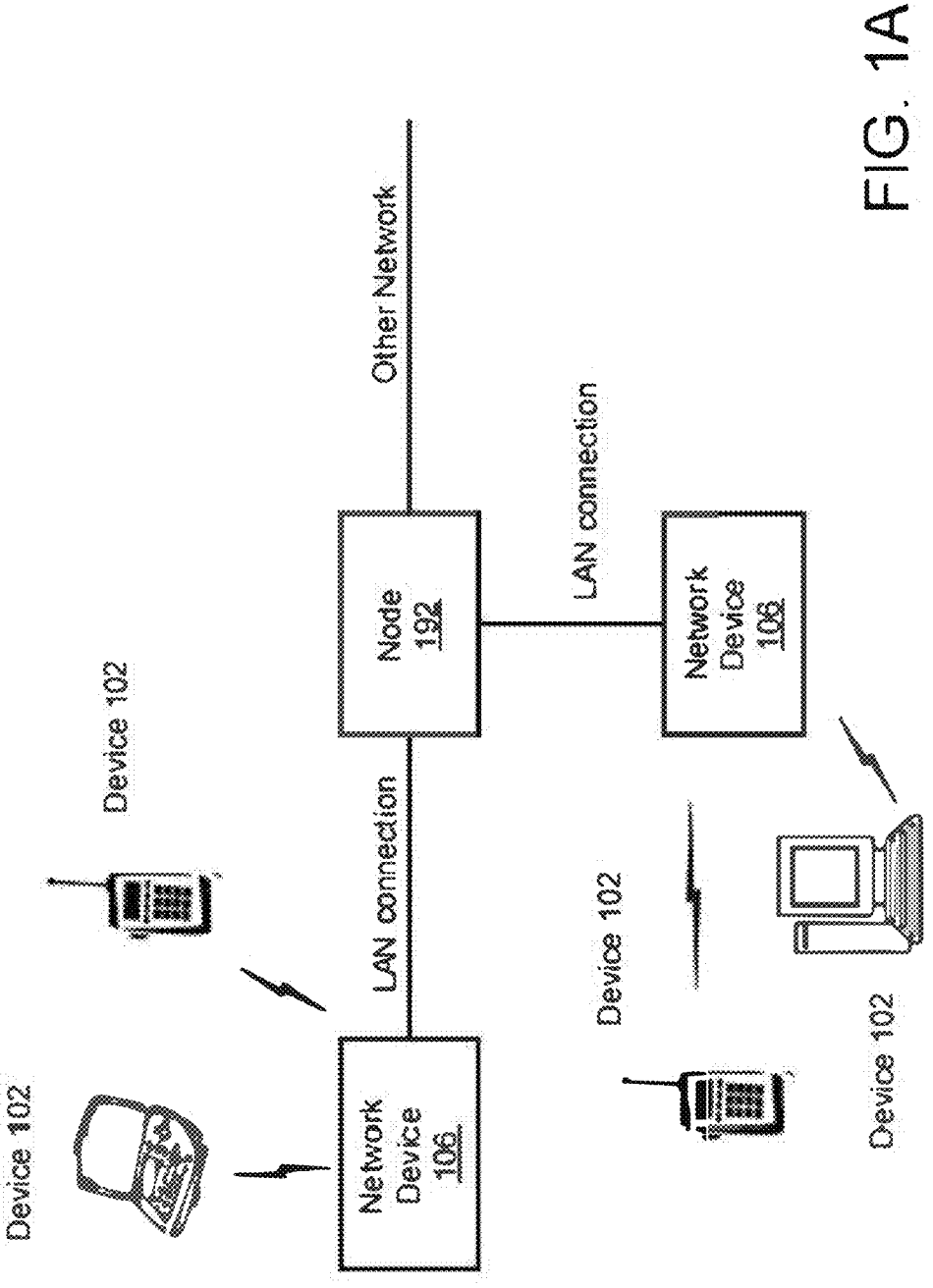
FIG. 1A is a block diagram depicting a network environment including one or more access points in communication with one or more devices or stations, according to some embodiments.

The present embodiments shall now be described in detail with reference to the drawings, which are provided as illustrative examples of the embodiments so as to enable those skilled in the art to practice the embodiments and alternatives apparent to those skilled in the art. Figures and examples below are not meant to limit the scope of the present embodiments to a single embodiment, but other embodiments are possible by way of interchange of some or all of the described or illustrated elements, or those apparent to a person of ordinary skill in the art. Certain elements of the present embodiments can be partially or fully implemented using known components, only those portions of such known components that are necessary for an understanding of the present embodiments shall be described, and detailed descriptions of other portions of such known components will be omitted so as not to obscure the present embodiments. Embodiments described in their illustrated contexts should not be limited thereto. For example, embodiments described as being implemented in software should not be limited to such implementation alone, but they can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

The following IEEE standard(s), including any draft versions of such standard(s), are hereby incorporated herein by reference in their entirety and are made part of the present disclosure for all purposes: Wi-Fi Alliance standards and IEEE 802.11 standards including but not limited to IEEE 802.11a™, IEEE 802.11b™, IEEE 802.11g™, IEEE P802.11n™; IEEE P802.11ac™; and IEEE P802.11be™ draft version D3.0 standards. Although this disclosure can reference aspects of these standard(s), the disclosure is in no way limited by these standard(s).

For purposes of reading the description of the various embodiments below, the following descriptions of the sections of the specification and their respective contents can be helpful:

Section A describes a network environment and computing environment which can be useful for practicing embodiments described herein;

Section B describes MAC header protection with pre-existing keys.

A. Computing and Network Environment

Prior to discussing specific embodiments of the present solution, it can be helpful to describe aspects of the operating environment as well as associated system components (e.g., hardware elements) in connection with the methods and systems described herein.

Referring to FIG. 1A, an embodiment of a network environment is depicted. In brief overview, the network environment includes a wireless communication system that includes one or more access points (APs) or network devices 106, one or more stations, also referred to as STAs or wireless communication devices 102 and a network hardware component or network hardware 192. The wireless communication devices or STAs 102 can for example include laptop computers, tablets, personal computers, and/or cellular telephone devices. The details of an embodiment of each station or wireless communication device 102 and AP or network device 106, such as their internal hardware and software configurations, can be described in greater detail with reference to FIGS. 1B and 1C. The network environment can be an ad hoc network environment, an infrastructure wireless network environment, a subnet environment, etc. in one embodiment. The network devices 106 or APs can be operably coupled to the network hardware 192 via local area network connections.

Network devices 106 or APs can include, for example, Wi-Fi devices providing WLANs, or 5G base stations for providing cellular networks. The network hardware 192, which can include a router, gateway, switch, bridge, modem, system controller, appliance, etc., can provide a local area network connection for the communication system. Each of the network devices 106 or APs can have an associated antenna or an antenna array to communicate with the wireless communication devices in its area. The wireless communication devices 102 can register with a particular network device 106 or AP to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to network device 106 or AP.

In some embodiments, a network device 106 or AP includes a device or module (including a combination of hardware and software) that allows wireless communication devices 102 to connect to a wired network using wireless fidelity (Wi-Fi), or other standards. A network device 106 or AP can sometimes be referred to as a wireless access point (WAP). A network device 106 or AP can be implemented (e.g., configured, designed and/or built) for operating in a wireless local area network (WLAN). A network device 106 or AP can connect to a router (e.g., via a wired network) as a standalone device in some embodiments. In other embodiments, network device 106 or AP can be a component of a router. Network device 106 or AP can provide multiple devices access to a network. Network device 106 or AP can, for example, connect to a wired Ethernet connection and provide wireless connections using radio frequency links for other devices 102 to utilize that wired connection. A network device 106 or AP can be implemented to support a standard for sending and receiving data using one or more radio frequencies. Those standards, and the frequencies they use can be defined by the IEEE (e.g., IEEE 802.11 standards). A network device 106 or AP can be configured and/or used to support public Internet hotspots, and/or on a network to extend the network's Wi-Fi signal range.

In some embodiments, the access points or network devices 106 can be used for (e.g., in-home, in-vehicle, or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points or network devices 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more access points or network devices 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
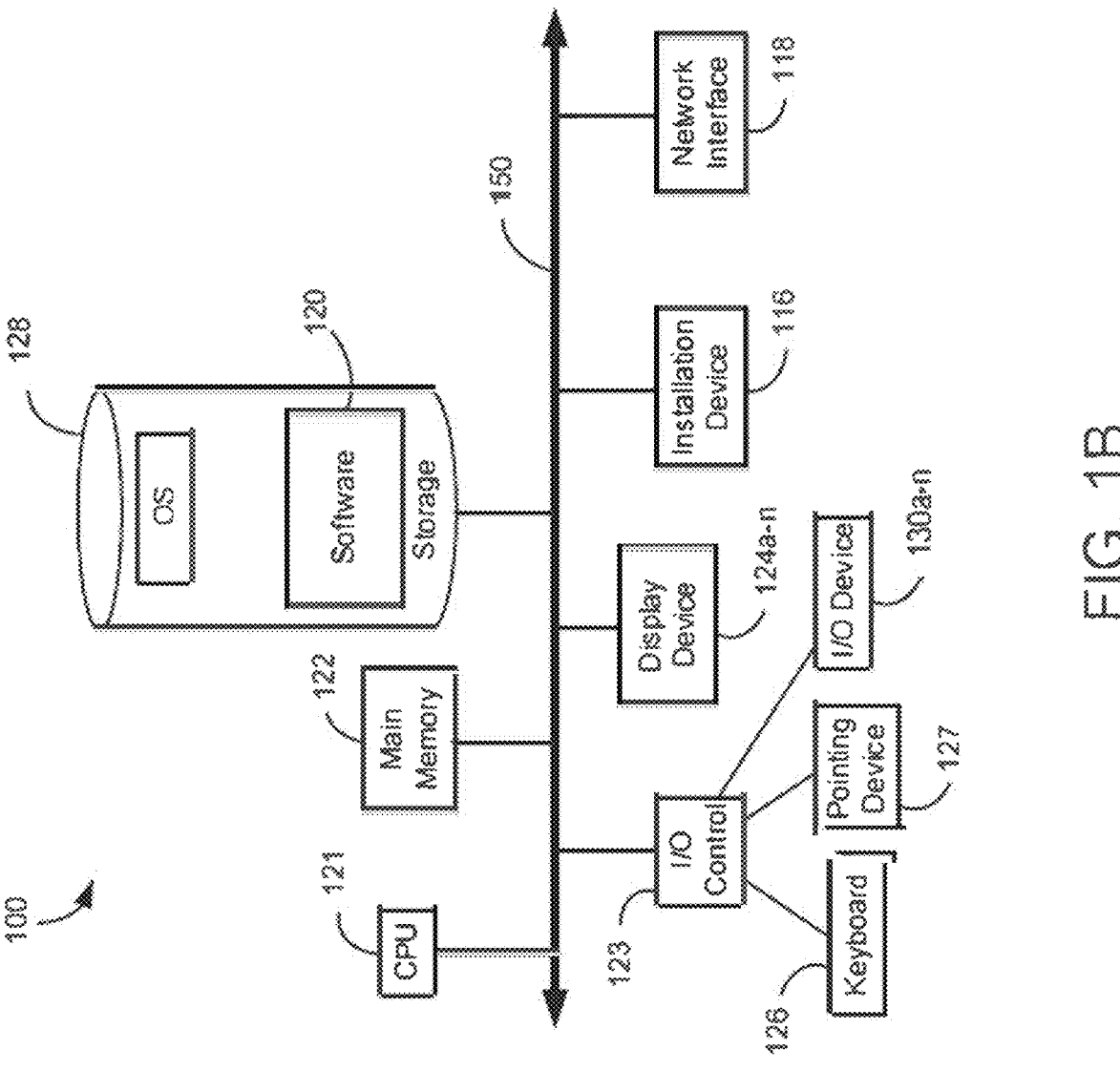
FIGS. 1B and 1C are block diagrams depicting computing devices useful in connection with the methods and systems described herein, according to some embodiments.
Figure 1C:
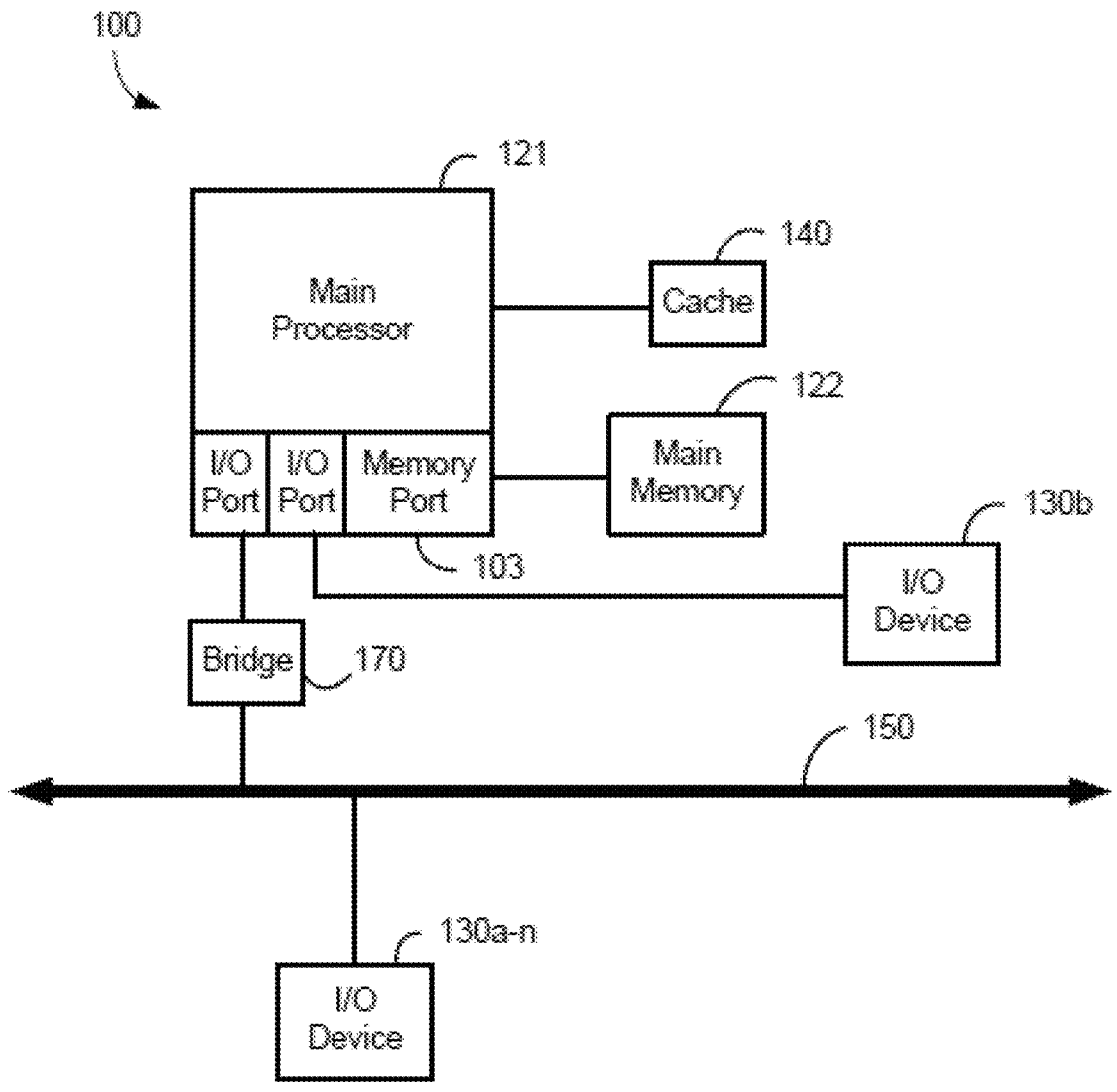

The communications device(s) 102 and access point(s) or network devices 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or network device 106. As shown in FIGS. 1B and 1C, each computing device 100 includes a processor 121 (e.g., central processing unit), and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130a-130n, and a cache memory 140 in communication with the central processing unit or processor 121.

The central processing unit or processor 121 is any logic circuitry that responds to, and processes instructions fetched from the main memory unit 122. In many embodiments, the central processing unit or processor 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor capable of operating as described herein.

Main memory unit 122 can be one or more memory chips capable of storing data and allowing any storage location to be directly accessed by the microprocessor or processor 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above described memory chips, or any other available memory chips capable of operating as described herein. In the embodiment shown in FIG. 1B, the processor 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory unit 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit or processor 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer or computer system 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be configured for using multiple display devices 124a-124n. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a fiber optic bus, a Serial Attached small computer system interface bus, a USB connection, or a HDMI bus.

A computing device 100 of the sort depicted in FIGS. 1B and 1C can operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8 and 10, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system or computing device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. MAC Header Protection with Pre-Existing Keys

When in the course of network communications, data packets are retransmitted by a sender, some header fields within the Media Access Control (MAC) header of the data packet can be subjected to change by malicious actors. In some types of network communications, such as wireless local area network (WLAN) communications (e.g., Wireless Fidelity or Wi-Fi), MAC headers may include data that is not encrypted. These unprotected header fields can be masked initially but can be intercepted and changed on a resend of the transmission, allowing for potential attacks on a system. This vulnerability opens the door for potential attacks on a system, since an adversary can manipulate fields, such as power management state and aggregation state. Encryption mechanisms, such as Counter Mode Cipher Block Chaining-MAC Protocol (CCMP) and Galois/Counter Mode Protocol (GCMP), can be used to encrypt and compute Integrity Check Value/Message Integrity Code (ICV/MIC) for the frame. However, some of the MAC header fields can still remain unprotected and vulnerable to attacks.

To address this issue, the technical solutions can use preexisting encryption keys to generate or compute a MIC on a MAC header, thereby capturing the original state of the MAC address for network packet integrity verification upon receipt by the receiving device. In some examples, the computed MIC can be integrated with the one computed for the entire frame, preserving the existing security measures. This mechanism can be efficient, as it can be employed multiple times on a given frame without introduction of additional states or keys, thus providing additional security without incurring additional compute resources.

The lack of protection for specific fields within the MAC header, such as the power management (PM) bit and sequence number can cause network traffic security challenges. Absence of safeguards on these MAC header fields can lead to potential unauthorized modifications by attackers, adversely affecting affect device performance and disrupting the aggregation states. Using an alternative set of keys to address this security gap can be undesirable as it may involve the maintenance of additional hardware (HW) and software (SW) states to support such keys. Furthermore, a defined mechanism would be used for the maintenance and management of replay states for MAC headers, along with procedures for the definition and derivation of these keys and the management of their rotation or changes, all of which would add to the complexity beyond the current security measures in place.

The technical solutions of this disclosure aim to extend and repurpose existing mechanisms, reusing existing key mechanisms for MAC header protection. This approach can minimize the HW and firmware (FW) states to develop for providing protection to the MAC header, leveraging the existing replay check to allow for detection of replays in the context of MAC header protection. The CCMP and GCMP mechanisms can be used or extended to seamlessly integrate the MIC computed for MAC header protection. This integration can occur without altering the frame's format, eliminating the need for additional space. In cases in which encryption for MAC header protection is desired, the same keys can be used, but the frame can carry supplementary encrypted data. To circumvent security concerns, the technical solutions utilize the Initialization Vector (IV) (16 octets) using the Packet Number (PN) (6 octets) that is distinct. This comprehensive approach positions the solution to effectively address emerging challenges in 11bn deployments.

The technical solutions can use a different set of keys. To do replay check for MAC header protection independently, the header protection can utilize additional space/fields in the frame to carry the header field information encrypted using the same keys. UHR/11bn can be relevant for Wi-Fi customers, satisfying a higher level of security with lower cost.

These technical solutions can maintain the same frame format without introducing a specific MAC Header Protection (MHP) header. The number of unicast keys can remain unchanged. The coupling of the MHP header with the tag from body encryption can be used to prevent potential attacks, as the absence of coupling can lead to the mixing of the MHP header of one frame with the body of another, potentially resulting in the loss of protection for changed header fields. The use of the same key, metadata algorithm, and PN with MHP can be provided, with no alterations to protocols, such as the 4-way handshake, while additional replay check and corresponding transmission and reception states for MHP keys can be avoided. The Operating Channel Validation (OCV) feature can assist in eliminating multi-channel Man-in-the-Middle (MITM) attacks. These solutions can bring about minimal changes to current protocols, supporting both CCMP and GCMP, while reducing security vulnerabilities and aligning with the chaining of blocks using the same key, a characteristic shared with CCMP and GCMP.

Figure 2:
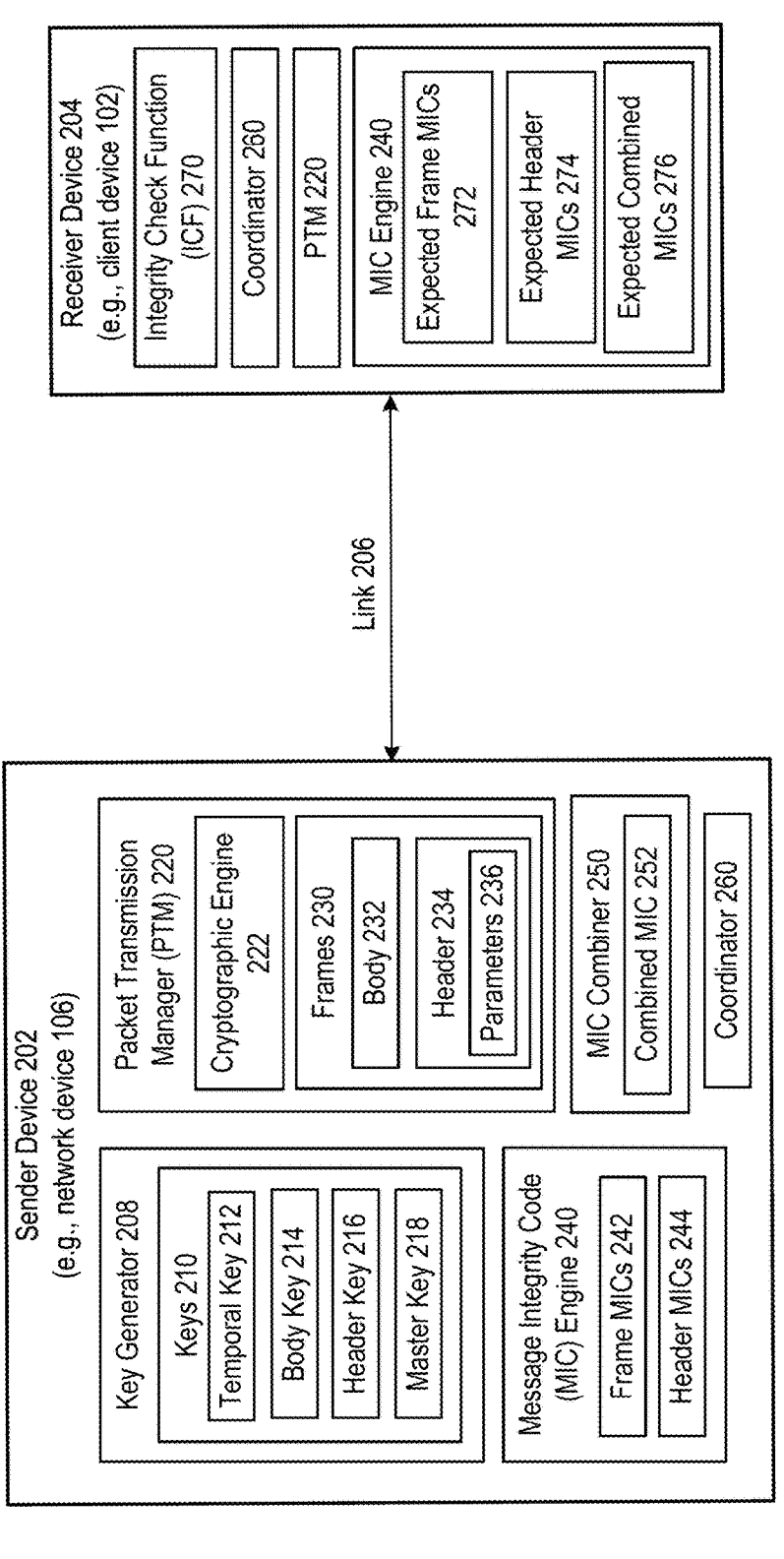
FIG. 2 is an example block diagram of a system for providing a MAC header protection with preexisting encryption keys, in accordance with the embodiments of the present solution.

FIG. 2 illustrates an example system 200 for providing a MAC header protection. System 200 can include a sender device 202 communicating with a receiver device 204 via a communication link 206. Sender device 202 can include one or more key generators 208, packet transmission managers (PTM) 220, message integrity code (MIC) engines 240, MIC combiners 250 and coordinators 260. Keys 210 can include one or more temporal keys (TKs) 212, body keys 214, header keys 216 and master keys 218. A MIC engine 240 can include, generate, process or provide one or more frame MICs 242 and header MICs 244 to be transmitted with the frame 230 to allow the receiver device 204 to verify the integrity of the transmission. PTM 220 can include one or more cryptographic engines 222 for encrypting frames 230 using keys 210. Each frame 230 can include at least a body 232 and a header 234 having one or more header parameters 236 (e.g., data bits to encrypt and protect). MIC combiner 250 can include or generate one or more combined MICs 252 to be used for communication with a receiver device 204.

Across the link 206, the receiver device 204 can include one or more coordinators 260 for establishing and exchanging network communications and one or more PTMs 220 for processing network packets (e.g., frames 230). Receiver device 204 can also include one or more MIC engines 242 including or generating one or more expected frame MICs 272, expected header MICs 274 and expected combined MIC 276. Receiver device 204 can include one or more integrity check functions (ICFs) 270 that can check and verify the integrity of the frames 230 received by the receiver device 204 by comparing the frame MICs 242 of the incoming frames 230 with expected frame MICs 272 generated by the MIC engine 242, comparing header MICs 244 of the incoming frames 230 with the expected header MICs 274 generated by the MIC engine 242 or comparing combined MIC 252 of the incoming frames 230 with the expected combined MIC 276.

Sender device 202 and receiver device 204, collectively referred to as devices 202 and 204, can each include any combination of hardware and software configured for network communication via a wired or a wireless network. Sender device 202 and the receiver device 204 can each be or include any network device 106 (e.g., a Wi-Fi access point), a client device 102 (e.g., computer or a smartphone) or a node 192 (e.g., a router or a gateway), or a functionality provided by a cloud-based system. Sender device 202 and the receiver device 204 can include or utilize a computing system 100, and can include and utilize one or more processors (e.g., 121) which can be coupled with memory (e.g., 122) and utilize instructions stored in the memory or software 120 to implement the functionality of the sender device 202 or receiver device 204.

Link 206 can include any physical or logical connection facilitating data transmission between devices 202 and 204. Link 206 can include a wide range of wired and wireless network or communication technologies, including WLAN, Wi-Fi, cellular networks, and various forms of wired connections. For instance, in a Wi-Fi network, the link 206 can include radio wave signals transmitted between an access point and client devices, facilitating wireless data transmission. For instance, communication link 206 can include radio frequency signals transmitted between base stations and mobile devices, supporting voice and data communication over long distances. For instance, links 206 can include or be part of an Ethernet or fiber optic connection network including physical cables that transmit data packets between devices. The communication link serves as the medium through which frames 230 (e.g., data or network packets) are transmitted.

Frames 230, also referred to as network packets, can include any discrete units of data transmitted over a network (e.g., links 206). Each frame 230 can include a body 232 and a header 234 and can encapsulate the payload data and the control information for routing and processing of the network packet. For instance, in a wireless communication system, frames 230 can include payload data (e.g., text, video, sensor readings or any other data to be transferred) in the body 232 section, while the header 234 section can include information such as packet sequence numbers and addressing information. Frame 230 can be a frame of a link layer (e.g., MAC layer), an internet layer or a network layer, a transport layer, a session layer, a presentation layer or an application layer in either an Open Systems Interconnection (OSI) model or a TCP/IP model.

Body 232 of a frame 230 can include any data payload to be transmitted over the network (e.g., via links 206). Body 232 can include various types of information depending on the application, such as sensor readings, audio/video streams, textual content of emails or documents, or any application-specific data. Body 232 can include payload data on temperature readings from sensors, data from applications running on a computing device, portions of images or videos or any other information being transmitted. Body 232 can be encrypted using various encryption techniques, including for example keys 210, such as the body key 214.

Header 234 can be any portion of a frame 230 (e.g., a network packet) that includes control information for the frame, such as source and destination internet protocol addresses, protocol information, error detection codes and other metadata. Header 234 can include parameters 236 of any information or data (e.g., control signals or metadata) for routing and processing of the frame 230. Header 234 can include parameters 236, such as data bits for, indicative of, or corresponding to, packet sequence numbers, source and destination addresses, frame control bits. Header 234 can be a header for a MAC layer Header 234 can include information providing the context for the frame and facilitating devices on the network to interpret and process the transmitted data accurately. For instance, the header 234 of a frame 230 in a Wi-Fi network can include information about the frame type, transmission rate, and frame duration.

Parameters 236 can include any values or indicators within a header 234. Parameter 236 can include specific fields or attributes that are being protected to facilitate data integrity during transmission. Parameters 236 can include packet numbers, frame control bits, and other header fields critical for network protocol operations. Protecting parameters 236 from tampering by third parties can prevent unauthorized modifications that could compromise the integrity of the transmitted data. For example, in a wireless communication system, parameters 236 such as the frame sequence number and frame type can be protected to maintain the reliability of the communication.

Keys 210 can include any types and forms of cryptographic keys used in securing communication between devices 202 and 204. Keys 210 can include any cryptographic keys used by the system, including temporal keys (TKs) 212, body keys 214, header keys 216, and master keys 218. TKs 212 can be temporal keys implemented in hardware (e.g., permanent storage) of a system and can be used by devices 202 and 204 for various communication sessions. Body keys 214 and header keys 216 can be used for encrypting at least portions of the body 232 and header 234 of frames 230 in their entirety or any portion, as well as with respect to any layer (e.g., data link or MAC layer). Master keys 218 can serve as the root keys from which TKs can derived during handshakes and negotiations between devices 202 and 204.

Temporal key (TK) 212 can include any cryptographic key stored, programmed or implemented in hardware. TK 212 can be generated or derived from a master key 218 and can be used to secure the transmission of data between devices 202 and 204. For example, in a Wi-Fi network, TKs are generated during the authentication and key establishment process between a client device and an access point, to facilitate the confidentiality and integrity of data exchanged between devices over a time period, such as a time period following a handshake or a session.

Body key 214 can include any cryptographic key used for encrypting the body 232 of a frame 230 for the transmission of the frame (e.g., network packet). Body key 214 can be derived from the TK 212, which can be stored in storage. Body key 214 can be utilized to secure the confidentiality of the payload data contained within the frame's body. For instance, in a wireless communication system, body key 214 can be used to encrypt portions of texts, images, videos, sensor readings or other sensitive information before transmission over the network.

Header key 216 can include any cryptographic key used for encrypting the header of a frame during transmission. As with a body key 214, a header key 216 can be is derived from the TK 212 and used to facilitate the confidentiality and integrity of the header information (e.g., parameters 236) within the frame 230. For example, in a wireless network, the header key 216 can be used to encrypt control information such as packet sequence numbers and frame control bits, preventing unauthorized access or manipulation of the header data.

Master key 218 can include any cryptographic key that serves as a root key. The temporal keys (TKs) 212 may be derived from the master key. Master key 218 can be established during the initial setup of a secure communication environment and can be used to generate a TKs 212 for subsequent communication sessions between two network devices. For example, in a wireless network, the master key 218 can be distributed during the authentication and key establishment process between devices, providing a secure foundation for generating TKs 212 from the master key 218 used during data transmission.

Key generator 208 can include any combination of hardware and software for generating keys 210. Key generator 208 can include the functionality for generating cryptographic keys 210 used in securing communication between devices. Key generator 208 combines hardware and software elements to produce keys 210 such as temporal keys (TKs) 212, body keys 214, header keys 216, and master keys 218. For example, in a wireless network, the key generator 208 can utilize algorithms to derive TK 212 from a master key 218 during a handshake or establishment of a secure connection between devices 202 and 204.

Key generator 208 can include the functionality to compute, using a temporal key (TK) 212 programmed in hardware, a body key 214 for a body of a frame 230 and a header key 216 from a header of the frame 230. The header key 216 can be different from the body key 214. Key generator 208 can compute the body key 214 or the header key 216 using a hash-based message authentication code (HMAC) operation with a first input of the TK 212 and a particular (e.g., a first) fixed pattern. The fixed pattern can include any predetermined sequence of values (e.g., a parameter 236, or characters). The fixed pattern can be used to derive the header key 216 or body key 214 for an encryption process. Key generator 208 can include the functionality to compute computing another key using the HMAC operation with a second input of the TK 212 and a second fixed pattern. The first fixed pattern can include a packet number (PN) or any other content of a header 234 of a network packet of the frame and the second fixed pattern can include one or more characters (e.g., content) of the body.

Key generator 208 can include the functionality to compute either the body key 214 or the header key 216 using an Advanced Encryption Standard (AES) algorithm. Key generator 208 can include the functionality to compute either the frame MIC 242 or the header MIC 244 using at least one of a Cipher Block Chaining-MAC Protocol (CCMP) or a Galois/Counter Mode Protocol (GCMP), or any other alternative protocols.

Key generator 208 can include the functionality to handle retransmitted frames 230 so as to protect the headers 234. When frame 230 is retransmitted, key generator 208 can compute, using the TK 212, a body key 214 for a second body 232 of the second frame 230 of the second network packet being retransmitted. The key generator 208 can compute a header key 216 for the second header 234 of the second frame 230. The first header key 216 of the header 234 of a prior frame 230 can be different from the new or a second header key 216 of the header 234 of the frame 230 being retransmitted.

Key generator 208 can utilize a packet number from the sequence to create the header key 216 which would be unique to each of the frames 230 in the sequence of frames as each frame 230 can have a different packet number. The body key 214 for the second body 232 of the second frame 230 of the second network packet can be same as the body key 214 of the body 232 of the prior (e.g., previously transmitted) frame 230. As key generator 208 can utilize the content of the retransmitted frame 230, which may be identical to the prior transmitted frame 230, the body key 214 can be the same, while the header key 216 (e.g., being based on a different packet number or other identifier of the packet) can differ for each retransmitted frame 230.

Key generator 218 can include the functionality to determine the pairwise master key (PMK) 218 during a negotiation or a handshake between devices. For instance, the key generator 208 can include the functionality to determine the PMK 218 during an exchange over a wireless network between devices 202 and 204. For instance, the PMK 218 can be determined based on data, content or control signals exchanged between the devices 202 and 204 during the sequence. Key generator 218 can use the PMK 218 to generate the TK 212. The TK 212 can be stored in the hardware, such as storage device (e.g., 128), from which the key generator 218 can retrieve it to use for generating body keys 214 and header keys 216, based on the contents of the bodies 232 and headers 234.

Packet transmission manager (PTM) 220 can include any combination of hardware and software for managing or controlling packet transmissions. PTM 220 can include one or more components or circuits for managing and implementing transmissions and receiving of network packets (e.g., frames 230) between sender device 202 and a receiver device 204. PTM 220 can include the functionality to facilitate reliable and efficient transmission of data over the network. For example, in a wireless communication system, the PTM can coordinate the encryption and transmission of frames 230 between a sender device and a receiver device, employing cryptographic engines 222 to secure the data during transmission.

PTM 220 can include the functionality to transmit the frame with the first MIC (e.g., frame MIC 242) and the second MIC (e.g., header MIC 244) to a receiver device 204. The receiver device 204 can be configured to determine integrity of the header 234 of the frame based at least on the second MIC (e.g., header MIC 244), such as by using an integrity check function 270 of the receiver device 204. PTM 220 can be configured to transmit a combined MIC 252 to the receiver device 204 to determine the integrity of the frame 230.

When transmitting a series of frames 230, PTM 220 can resend frames 230 which did not transmit successfully in the prior attempts. In such instances, the frame 230 can include a parameter 236 for a packet number (PN) of the frame 230 uniquely identifying the frame 230 from other frames 230 in the series, including identical frames 230 previously sent. Upon determining that a first network packet was not received, the PTM 220 can determine to resend the first network packet as a second network packet having a parameter 236 that uses a second packet number in a second header 234 of a second frame 230 of the second network packet, which is different from a first PN of the preceding frame 230. As such, the second packet number (e.g., parameter 236) of the resent frame 230 can be different than the first packet number (e.g., parameter 236) of the originally transmitted frame 230, even if the payloads of the two frames 230 are identical. As each of these two frames 230 can have their headers 234 having different PN parameters 236, the header MICs 244 of these two frames 230 will be different, thereby allowing the ICF 270 of the receiver 204 to detect any tampered frames 230 as their expected header MICs 274 will not match the header MICs 244 received with the incoming frames 230.

For instance, PTM 220 can utilize a cryptographic engine 222 to encrypt each header 234 of the frames 230 transmitted using header key 216. PTM 220 can utilize a cryptographic engine 222 to encode for the header 234 of each frame 230 a unique PN (e.g., parameter 236) of the frame 230. PTM 220 can utilize a MIC engine 240 can generate a header MIC 244 of the header 234 of the encryption of the header 234. For example, PTM 220 can transmit the header MIC 244 along with the frame 230 to the receiver device

204. In some instances, the header MIC 244 can be included in the header 234 of the frame 230 being transmitted. Upon receiving the frame 230, the ICF 270 can utilize the MIC engine 242 of the receiver device 204 to generate an expected frame MIC 272, an expected header MIC 274 or expected combined MIC 276. Should an attacker intercept and tamper with the parameters 236 of the header 234 of the incoming frame 230, the header MIC 244 will not match the expected header MIC 274, and the ICF 270 will determine, based on a failed match, that the integrity of the incoming frame 230 has failed. In response to such a determination, ICF 270 can send a message to the sender device 202 to notify the sender device 202 to resend the frame 230 again.

Cryptographic engine 222 can include any combination of hardware and software for performing encryption and decryption operations of data transmitted over a network. Cryptographic engine 222 can utilize cryptographic algorithms such as the Advanced Encryption Standard (AES) to facilitate the confidentiality and integrity of transmitted data. For example, in a wireless communication system, cryptographic engines are employed to encrypt the body and header of frames using keys 210 that can be derived from the temporal key (TK) 212, protecting the data from unauthorized access or interception. Cryptographic engine 222 can encrypt the body 232 of the frame at a MAC layer using the body key 214 and the header 234 of the frame at the MAC layer using the header key 216. The encryption of the body 232 of the frame 230 at the MAC layer using the body key 214 can be performed concurrently with the encryption of the header 234 of the frame at the MAC layer using the header key 216.

Cryptographic engine 222 can include the functionality to identify one or more frames 230 at the MAC layer to be encrypted for wireless communications and encrypt the second frame 230 (e.g., retransmitted frame) of the second network packet at the MAC layer using the body key 214 of the second body 232 and the header key 216 for the second header 234 (e.g., of the second frame). For example, the retransmitted frame 230 can have its header key 216 and its header MIC 244 recomputed to account for any changes in the header parameters 236, such as the packet number parameter or any other parameter in the header 234 that may change.

Message integrity code (MIC) engine 240 can include any combination of hardware and software for computing or generating message integrity codes (MICs) for any portion of the frames 230. MIC engine 240 can include the functionality for generating any cryptographic codes used to verify the integrity of transmitted frames. MIC engine 240 can compute MICs (e.g., frame MICs 242, header MICs 244, expected frame MICs 272 or expected header MICs 274) for any frames 230 or headers 234. MIC engine 240 can generate frame MICs 242 and header MICs 244 which can be appended to the transmitted data to detect unauthorized alterations or tampering during the transmission between the sender device 202 and the receiver device 204. The MIC engine 240 can compute MICs (e.g., 242, 244, 252 or 272, 274, 276) for encrypted frames using hash-based algorithms. For instance, MIC engine 240 can compute a frame MIC 242 of an encrypted frame 230 using a body key 214 and compute a header MIC 244 of the frame at the MAC layer using a header key 216. MIC engine 240 can generate any MICs (e.g., 242, 244, 252, 272, 274 or 276) which can include cryptographic checksums generated for a portion of a frame (e.g., a portion of a body 232 or a header 234) or for a portion or the entire frame 230.

Frame MIC 242 can include any cryptographic code computed by the MIC engine 240 for verification of the integrity of the frame 230 transmitted from the sender 202 to the receiver 204. Frame MIC 242 can be sent with the frame 230 or appended to the encrypted frame data. Frame MIC 242 can be used by the receiver to compare with the expected frame MIC 272 which the receiver device 204 can compute independently to compare and detect if the received frame includes any unauthorized modifications or tampering. For example, in a wireless communication system, the frame MIC 242 can be computed using hash-based algorithms applied to the encrypted frame, providing a means for the receiver to check for the integrity of the received data.

Header MIC 244 can include any cryptographic code computed by the MIC engine 240 for verification of the integrity of the header 234 of the frame 230 transmitted from the sender 202 to the receiver 204. The header MIC 244 can include a cryptographic code computed by the MIC engine 240 to verify the integrity of the header information within a frame 230 during transmission. Header MIC 244 can be appended to the encrypted header data and can be used by the receiver device 204 to detect any unauthorized modifications or tampering of the header. This can be accomplished comparing the expected header MIC 274 which the MIC engine 240 of the receiver device 204 can generate to compare with the header MIC 244 received with the incoming frame 230. For example, in a wireless network, the header MIC 244 can be computed using hash-based algorithms applied to the encrypted header, enabling the receiver to verify the integrity of the header data.

Expected frame MIC 272 can include any cryptographic code computed by the MIC engine 240 of the receiver device 240 to be used as a reference value for comparing with and verifying the integrity of the received frame 230. Expected frame MIC 272 can be generated or computed based on the received frame's content, including for example both the body 232 and the header 234 of the frame 230. Expected frame MIC 272 can be computed using a predetermined algorithm and a TK 212 that can be previously shared with the receiver device 204. Expected frame MIC 272 can be computed using a TK 212 that is generated from a master key 218 that can be exchanged between the devices 202 and 204 during a handshake or a negotiation sequence between these two devices. For example, upon receiving a frame 230, the receiver device 204 can recalculate the frame MIC 242 using the same algorithm and compares it against the expected frame MIC 272. If the calculated frame MIC matches the expected frame MIC, the ICF 270 can determine and indicate that the frame content has not been tampered with during transmission. This comparison mechanism can be used to check for the integrity of the entire frame, providing assurance against unauthorized modifications.

Expected header MIC 274, also generated by the MIC engine 240 of the receiver device 204, can include any cryptographic code to be used as a reference value for comparing with and verifying the integrity of the received header 234 Expected header MIC 274 can be generated by the MIC engine 240 as an independent derivation of the header 234 by the receiver device 204 to compare with the header MIC 244 of the received frame 230. As with the expected frame MIC 272, the expected header MIC 274 can be computed using a predetermined algorithm based on the header 234 content. Upon receiving a frame 230, the receiver device 204 can extract the header MIC 244 transmitted with the frame 230 and compares the header MIC 244 with the expected header MIC 274 that can be generated from the received header 234 data. If the received header MIC 244 matches the expected header MIC 274, the ICF 270 can determine and indicate that the header 234 content has not been tampered with during transmission and the frame 230 can be validated or confirmed to be safe to process.

MIC combiner 250 can include any combination of hardware and software for integrating individual frame MIC 242 and header MIC 244 of a frame 230 to form a combined MIC 252 encompassing the header 234 and the body 232. The combined MIC 252 can include any cryptographic code formed by integrating individual frame and header MICs using the MIC combiner 250. MIC combiner 250 can combine hardware and software elements to perform operations to combine two or more MICs (e.g., 242 and 244). Operations that MIC combiner 250 can utilize to generate the combined MIC 252 can include any reversable operation, such as an XOR operation in which frame MICs 242 and header MICs 244 are combined in a bitwise XOR operation in which each bit of the output is the result of applying the XOR operation to two operands of two MICs. Operations can include any reversable operations in which each bit of the output is the result of applying the operation to input operands of the two MICs. Operations can include a concatenation on the frame MIC 242 and the header MIC 244 into a single string of characters. For instance, in a wireless communication system, the MIC combiner 250 can apply an XOR operation on the frame MIC 242 and header MIC 244 to form the combined MIC 252, which can be transmitted to the receiver for integrity verification. For instance, the combined MIC can be generated using one or more of, or any combination of: a concatenation of the first MIC and the second MIC, a bitwise exclusive OR (XOR) computation applied to the first MIC and the second MIC, or a bitwise AND computation applied to the first MIC and the second MIC.

Expected combined MIC 276, also generated by the MIC engine 240 of the receiver device 204, can include any cryptographic code to be used as a reference value for comparing with and verifying the integrity of the received combined MIC 252. Expected combined MIC 276 can be generated by the MIC engine 240 as derivation of the expected frame MIC 272 and expected header MIC 274. Expected combined MIC 276 can be combined using the MIC combiner 250 (e.g., deployed on receiver device 204) from the expected frame MIC 272 and expected header MIC 274, using the same or similar operations as those used to create combined MIC 252 (e.g., XOR or AND bitwise operations or concatenation of two MICs). For example, upon receiving a frame 230, the receiver device 204 can extract the combined MIC 252 and compare it with the expected combined MIC 276 independently derived on the receiver device 204 (e.g., using MICs 272 and 274). If the received combined MIC 252 matches the expected combined MIC 276, the ICF 270 can determine and indicate that the frame 230 is validated or confirmed to be safe to use and process.

Coordinator 260 can include any combination of hardware and software for establishing, configuring, and managing communications between devices in a network. Coordinator 260 can combine hardware and software elements to coordinate the exchange of data and ensure the proper functioning of the network. For example, in a wireless communication system, the coordinator 260 can facilitate the establishment of secure connections between devices, manages network resources, and resolves communication conflicts to maintain smooth operation.

Integrity check function (ICF) 270 can include any hardware and software for checking and verifying the integrity of incoming frames using the MICs of the sender device 202 and expected MICs of the receiver device 204. For instance, ICF 270 can include the functionality to extract from the frame 230 any of the MICs of the incoming frame (e.g., 242, 244 or 252) and comparing such MICs with either the expected frame MICs 272 or expected header MICs 274 of the receiver device 204. In response to determining that the MICs (e.g., 242, 244 or 252) of the sender device 202 match the MICs (e.g., 272, 274 or 276) of the receiver device 204, the ICF 270 can determine that the incoming frame 230 is For instance, in a wireless network, the ICF compares the received combined MIC with the computed MIC for the frame or header, verifying the integrity of the transmitted data before further processing. For instance, the receiver device 204 can be configured to determine the integrity of the header 234 based on a verification of integrity of the header 234 using the header MIC 244 prior to decrypting the frame. The receiver device 204 can be configured to verify the integrity of the header 234 of the frame using the header MIC 244 prior to processing the body of the frame.

Figure 3:
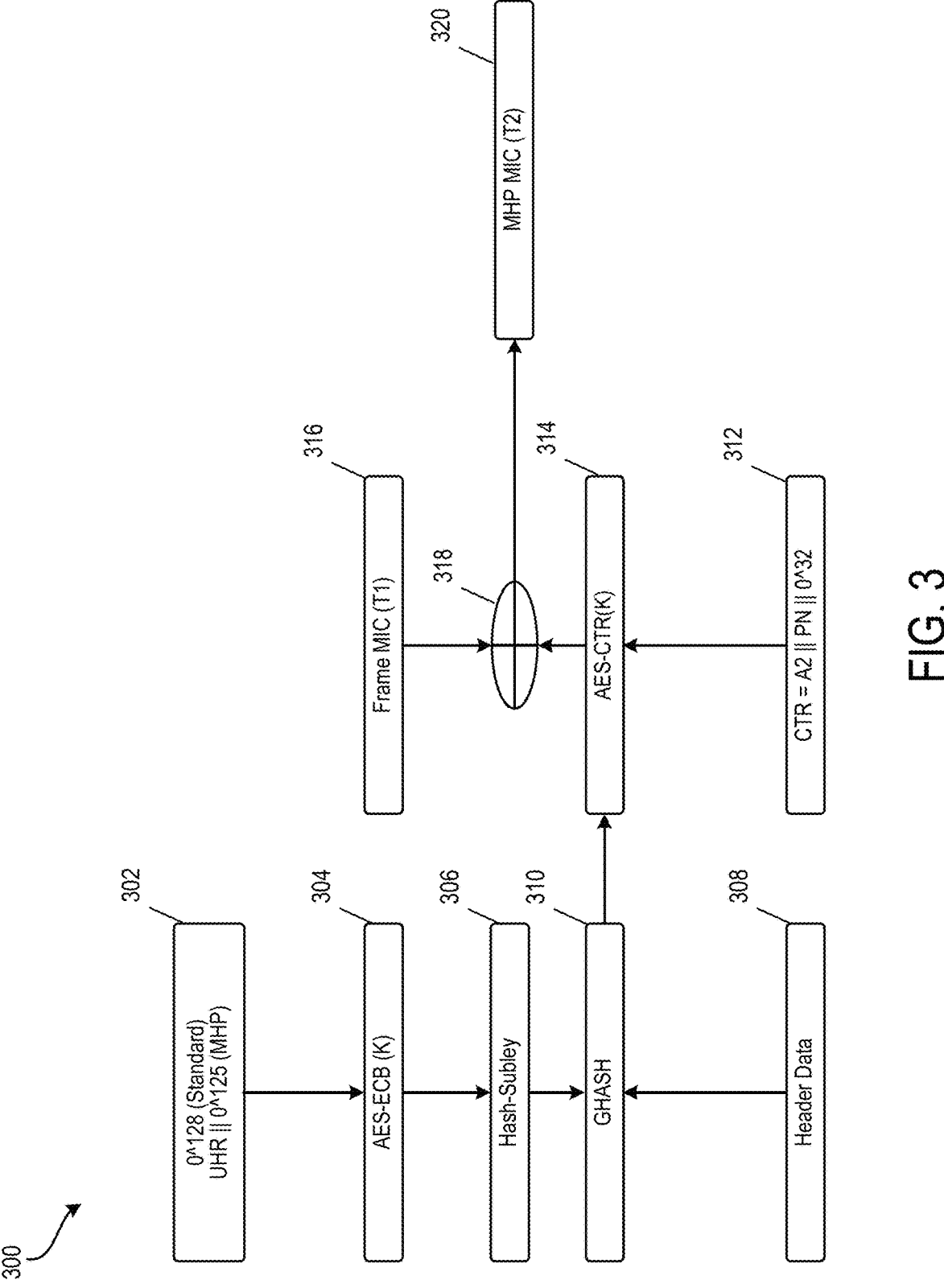
FIG. 3 is an example flow diagram for a MAC header protection, in accordance with the embodiments of the present solution.

FIG. 3 illustrates an example flow diagram of a method 300 for providing encryption for the MAC header protection in accordance with the technical solutions. The method 300 can be implemented using, for example, at least the functionalities discussed in connection with FIGS. 1A-2 and can include acts or operations 302-320 indicative of the actions taken or implemented by the example system (e.g., 200) during the course of the encryption process.

In one example, method 300 can begin by initializing with a specific value and defining a block based on the length of the initialization vector (IV). This can be followed by data encryption using AES-ECB with a given key, and the output being processed through a hash function. The resulting hash value can be utilized in a GHASH operation along with additional header data and the ciphertext, providing an output. Also, a block J can be constructed based on the IV and other parameters, and the ciphertext can be encrypted using AES-CTR. A Frame MIC can be generated, and a combining operation can be performed to obtain a final combined MIC, which may include components of the frame for integrity verification. Finally, an additional MIC, denoted as the MHP MIC (T2), can be generated.

At 302, the method can include input processing, in accordance with 0^128 (standard), UHR∥0^125 (MHP). For instance, the method can include processing the input data, such as generating an initialization vector (IV), which can include one or more unique values to initialize encryption mechanisms, such as the AES in a counter mode. The IV can then be combined with other data to produce an output.

At 304, the method can include an AES electronic-codebook (ECB) mode encryption. This block performs AES encryption in Electronic Codebook (ECB) mode using a key (K). ECB mode encrypts each block of data independently, making it suitable for parallel processing.

At 304, the method can include the AES-ECB encryption algorithm with a key (K). The AES-ECB can include a block cipher mode of operation that encrypts individual blocks of plaintext separately, to provide security by introducing a level of randomness into the encryption. The input data can be encrypted using the AES algorithm to produce ciphertext.

At 306, the method can apply a hash function to the data output at operation 302. The hash function can be a hash-subkey function, which can process data provided at act 304 to generate a hash value. This hash function can produce a unique fixed-size hash value for input data of arbitrary size. The output can be provided to operation 310.

At 308, the method can utilize header data processing, involving the manipulation or analysis of the header information within the communication frames. The header data can include parameters and metadata, including any control information for routing and processing the data payload. The output can be provided to operation 310.

At 310, the method can utilize a cryptographic function, such as a GHASH function. The GHASH function can be based on the Galois/Counter Mode (GCM) encryption algorithm and can be used for cryptographic authentication and integrity verification of data. This cryptographic function can compute a message authentication code (MAC) using Galois field multiplication and provide its output to operation 314.

At 312, the method can generate the counter (CTR) value, which can be used for the AES encryption in the counter mode of operation. The CTR value can be derived from the initialization vector (IV) and the packet number (PN), which can be used for generating the keys used in encryption. The output can be provided to operation 314.

At 314, the method can implement an AES-CTR encryption, utilizing the Counter (CTR) mode of operation with the AES algorithm. AES-CTR can encrypt plaintext by XORing it with the key (e.g., keystream) generated from the CTR value. This resulting output of combined or XOR'ed data provides an added level of integrity as it produces a ciphertext with encoded counter values. For instance, if a packet number (PN) parameter from a header of the frame in a series of frames is utilized, the output would be unique to the transmission instance, so that retransmitted frames, if tampered by an adversary, would be detected at the receiver device.

At 316, the method can compute the Frame MIC (Message Integrity Code), which can include a cryptographic checksum generated for the entire frame to verify its integrity during transmission. The Frame MIC can facilitate the verification that the transmitted frame has not been altered or corrupted maliciously in the course of transmission.

At 318, the method can combine the Frame MIC from operation 316 with the data output from the operation 314 (e.g., AES-CTR encryption) using a specified combining function. The combining function can include operations such as XOR (exclusive OR) or concatenation to merge the Frame MIC with the data output from operation 314. The resulting output can be, or include a combined MIC for the frame, which can function as a comprehensive integrity verification measure for the transmitted frame to be verified for frame integrity at the receiver device.

At 320, the method can include a generation of another MHP MIC (Message Integrity Code), acting as a cryptographic checksum for the MHP protocol. This MIC can be utilized for verification of integrity and authenticity of data transmitted using the MHP protocol.

Figure 4:
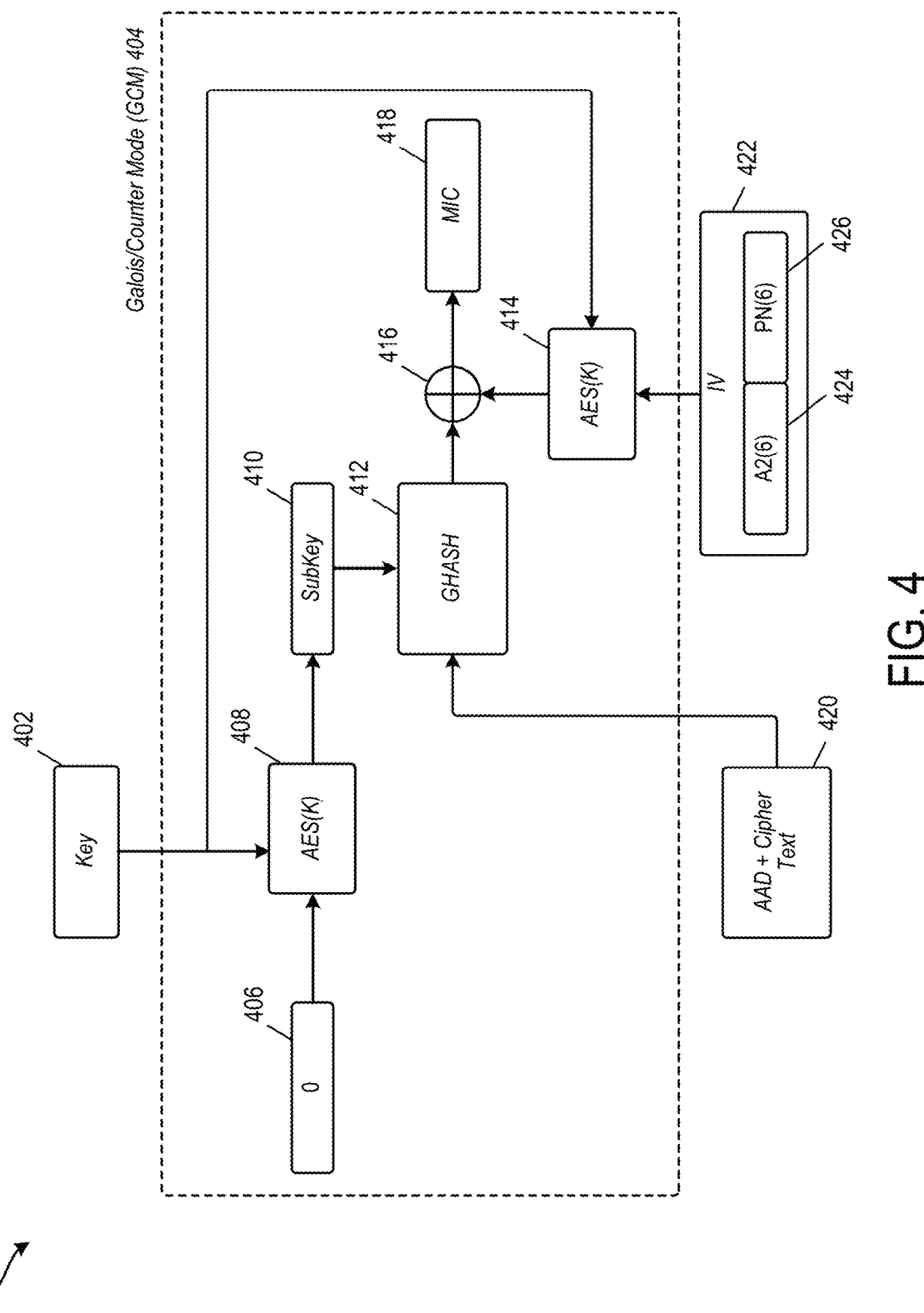
FIG. 4 is an example of another flow diagram for a MAC header protection, in accordance with the embodiments of the present solution.

Referring now to FIG. 4, an example block diagram of a method 400 for implementing a Galois Counter Mode (GCM) encryption to generate a MIC, in accordance with the technical solutions is illustrated. The method 400 can be implemented using, for example, at least the functionalities discussed in connection with FIGS. 1A-2 and can include acts or operations 402-426 indicative of the actions taken or implemented by the example system (e.g., 200) during the encryption.

For instance, in method 400, a system or configuration for GCMP MIP determination in Wi-Fi standard can involve pairwise transient key (PTK) or group temporal key (GTK)

for the UHR MAC header MIC. Since in the GCM the GHASH subkey can include an AES encrypted text of plain text 0, even if the text is known and even if the attacker knows the subkey, it can still be difficult to get the key (K) and compromise the data. Similarly, a pattern, such as "5555", or "ffff" can be used as AES input and the cipher text of that can be used as key for header MIC calculation. In the case of 256 bits GCMP, the solution may include two patterns.

At 402, the method identifies a key an input. The key (e.g., TK) which can function as the encryption key for the method. The key from can be input into and used by multiple blocks or functionalities of the block 404, "AES(K)," which performs AES encryption using the provided key. At 408, "AES(K)," processes the output of the operation 406, which can provide output of bits of "0," using an AES encryption function. The output of operation 408 can be input into operation 410 identified which can generate a subkey. The subkey can be utilized by operation 412, which can perform the GHASH operation, receiving additional input from operation 420 (e.g., AAD+Cipher Text), which can combine additional authenticated data with the ciphertext. At 414, AES(K) operation can receive input from operation 402 (e.g., the key), and from the operation 422. Operation 422 can provide an initialization vector (IV) which can include blocks 424 (e.g., A2(6)) and 426 (e.g., packet number parameter of the header), used to generate the IV. The output of the operation 414 can be fed into operation 416, which combines signals from the operations 412 and 414. At 418, the combined output from the operation 416 is provided, representing the generation of the MIC.

Figure 5:
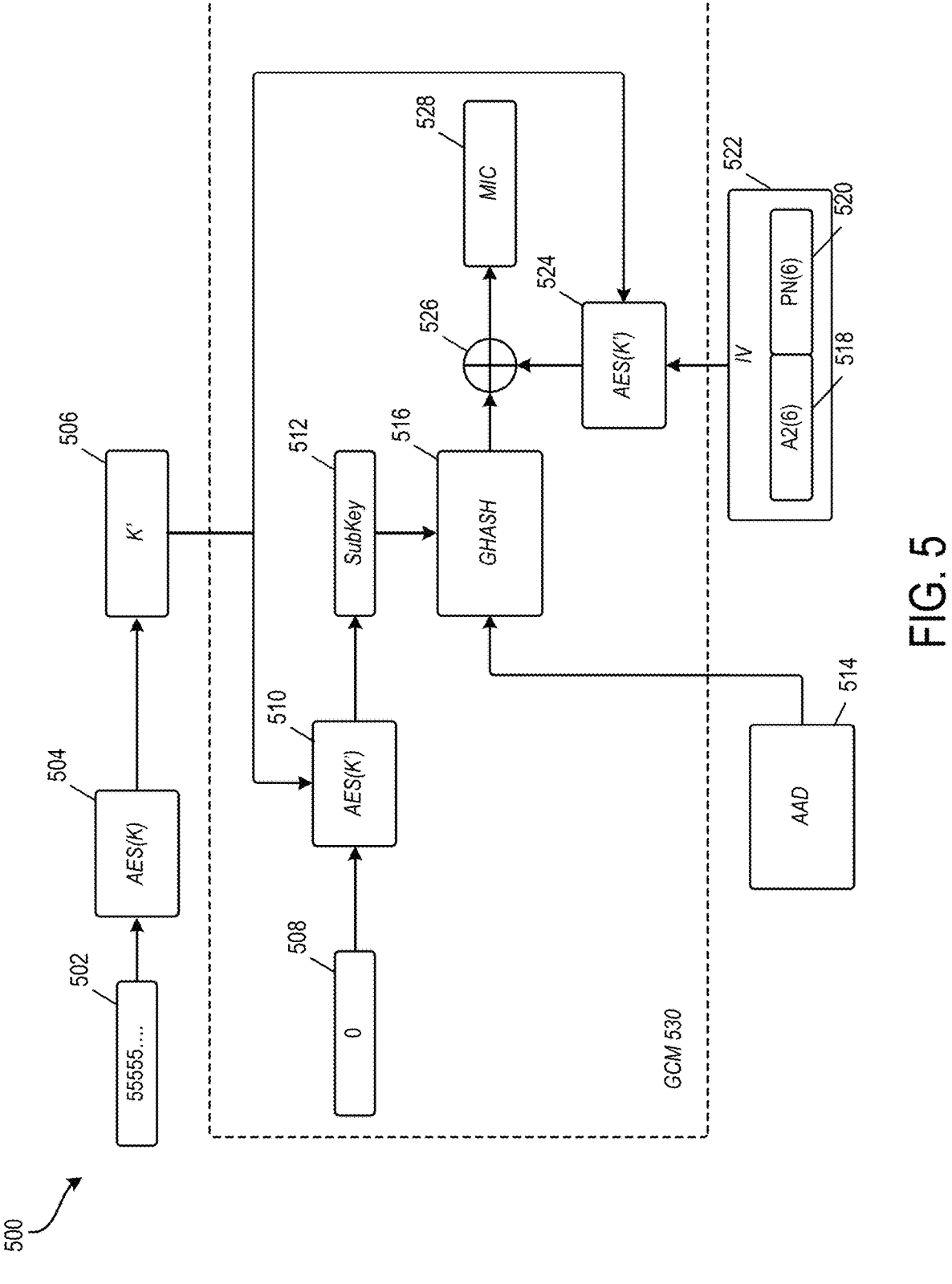
FIG. 5 is an example of flow diagram for providing a MAC header protection in accordance with the embodiments of the present solution.

Referring now to FIG. 5, another example block diagram of a method 500 for implementing a Galois Counter Mode (GCM) encryption to generate a MIC, in accordance with the technical solutions is illustrated. The method 500 can be implemented using, for example, at least the functionalities discussed in connection with FIGS. 1A-2 and can include acts or operations 502-528 indicative of the actions taken or implemented by the example system (e.g., 200) during the encryption.

Method 500 can correspond to a diagram of operations by a system 200 using configuration for key generation and GCMP for header MIC. In one aspect, the illustrated example can provide a key generation and GCMP for header MIC in which the same GCMP is still used, and key generation can be employed. In the case of 256 bits, two patterns may be defined for upper and lower 128 bits of key K'. For example, if a frame does not include a payload, it can have MIC out of the MAC header (existing PTK/GTK can be used) and the frame with payload can be protected using the existing mechanism. In such an example, there may not be two levels of credential verification for a single frame (e.g., one MIC verification for header and other one for decrypting the payload).

At 502, input stream for an AES function can be identified. The input stream can include a predetermined fixed pattern. Output from 502 can be used as an input into 504, which can include an AES(K) function. The output from 504 can be an input into 506 which can correspond to K' output of the AES encryption algorithm. Output from 506 (e.g., K') can be used as input into 510 and 524. Function 510 can include AES encryption of K' with another input from 508, which can include values "0" (e.g., padding).

Output from 510 can be provided as input to 512, which can correspond to a SubKey. The output from subkey can be provided as a first input to GHASH function at 516. The second input to 516 can be provided from 514 in which additional authentication data (AAD) is identified. Output from GHASH can be provided as a first of two inputs to 526 which can include a signal combiner for combining two signals. The second input into 526 combiner function can come from AES(K') operation at 525. The 525 can receive as its input an IV from 522. At 522, two blocks can be included to provide the IV, the first one being operation 518 having A2(6) and the second one being operation 520 having packet number (PN(6)), which can be used to generate IV The second input to 524 for generating the AES(K') function can be an input from 506 (e.g., K'). Output from 526 is MIC which can be provided at operation 528 using the output from 526.

Figure 6:
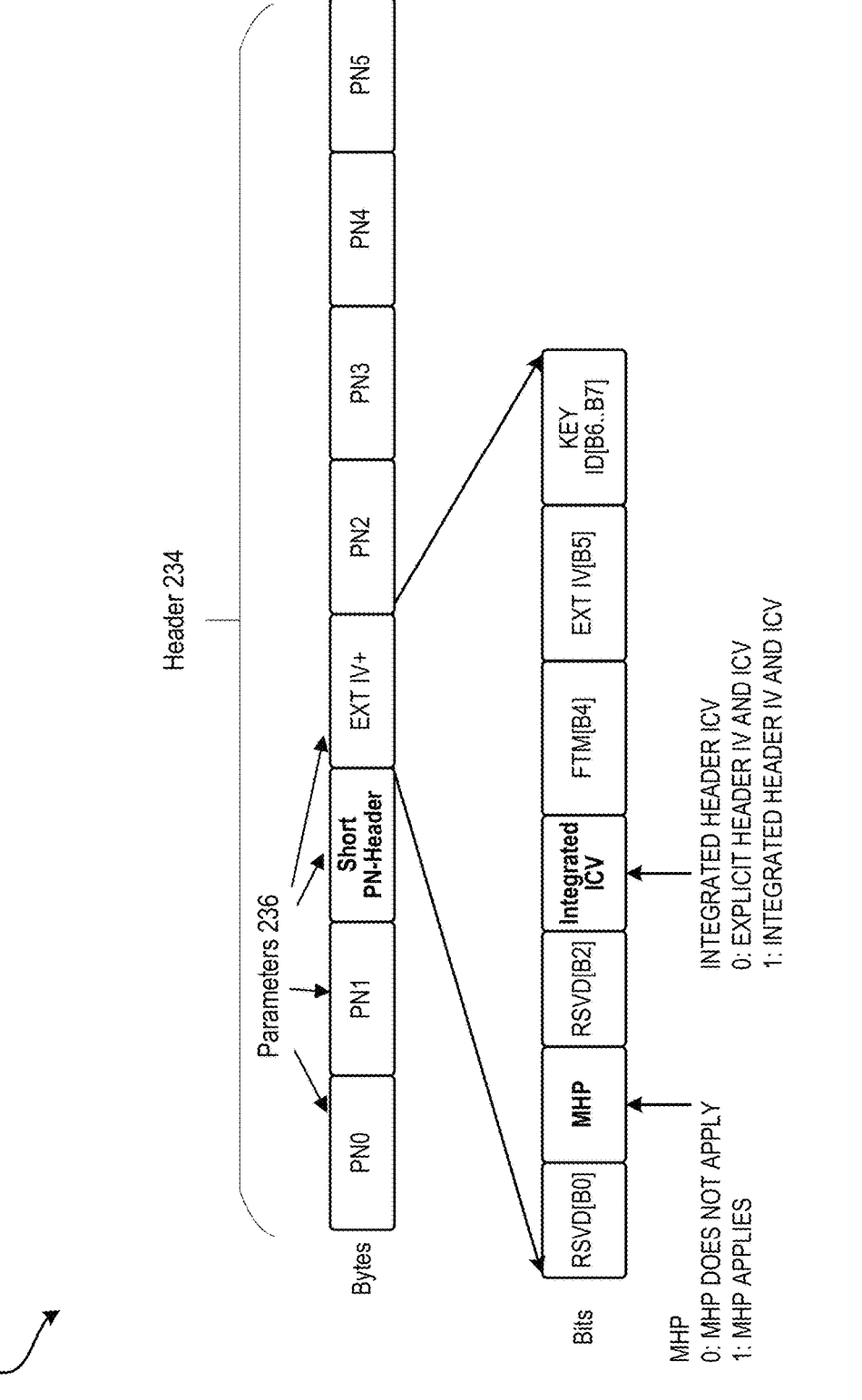
FIG. 6 is an example of a frame and a header in accordance with the embodiments of the present solution.

Referring now to FIG. 6, an example 600 of an arrangement of a header 234 of a frame 230 is illustrated. In example 600, the IV-body can indicate whether MAC header Protection (MHP) applies. In instances in which MHP is applicable, the IV-Body can signify whether it entails integrated IV and ICV or separate Header IV and Header ICV configurations.

The header 234 can be represented as a table of the bytes, where each field or slot in the table corresponds to a specific byte or set of bits within the header 234. The header 234 can include a plurality of parameters 236 arranged in various slots of the header 234. Parameters 236 can include packet numbers (PNs), such as PN0, PN1, a shorter version of the PN (e.g., Short PN-Header), and IV data, such as an extended initialization vector plus (EXT IV+) data. Parameters 236 of the header 234 can include slots that are arranged in a sequence of packet numbers for keeping track of the packet numbering within the communication stream.

Zooming into the "EXT IV+" slot, bit-level information of the EXT IV+ is shown. The bits of the EXT IV+ can correspond to bits that can be reserved for various functionality, such as RSVD[B0], MHP, RSVD[B2], Integrated ICV, FTM, EXT IV, and Key ID. In some examples, these bits can represent different attributes or flags associated with the extended initialization vector (IV). For example, the "MHP" bit can indicate whether the header 234 is capable of MHP functionality. In such a configuration, MHP of 0 may indicate that MHP does not apply to this frame 230, while MHP of 1 may indicate that MHP can be utilized. For example, Integrated ICV bit can specify whether the header 234 includes an integrated Integrity Check Value (ICV), which can be used to verify the integrity of the header data. For example, key ID bit can be implemented to indicate a particular cryptographic key 210 that can be used for the frame, or a body of the frame.

Figure 7:
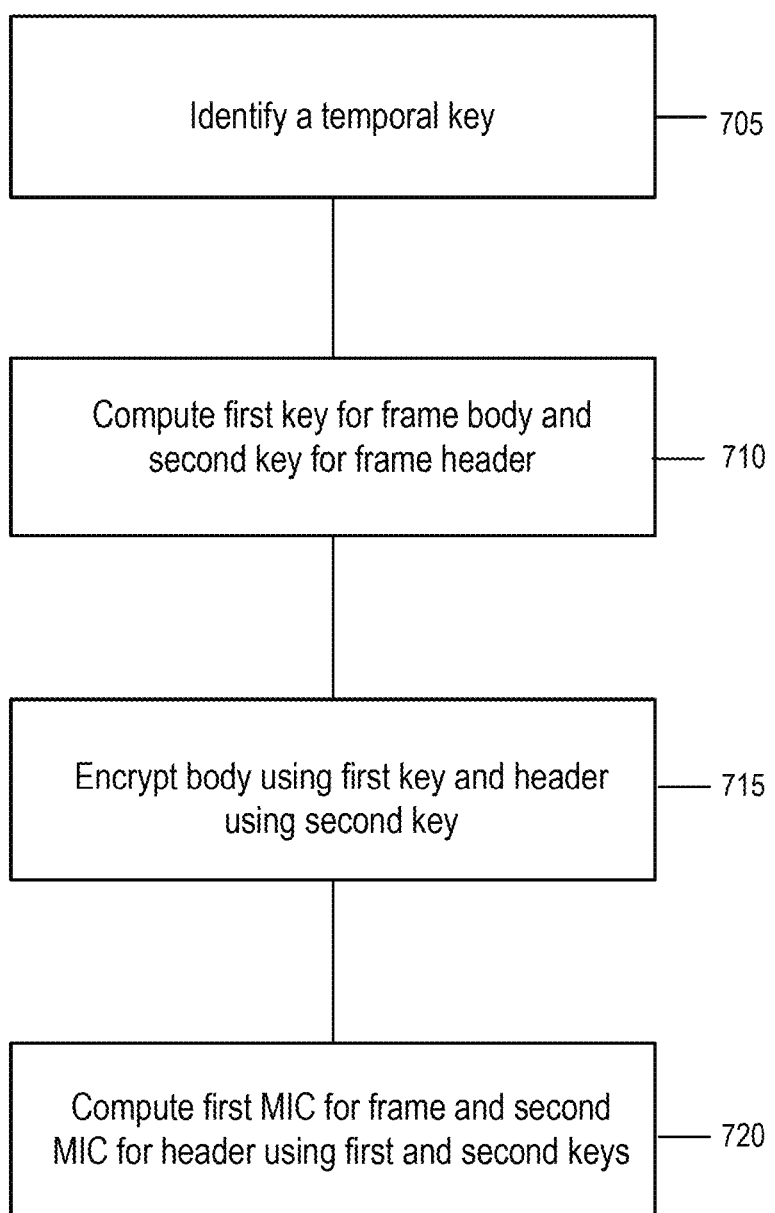
FIG. 7 is an example flow diagram of a method for providing a MAC header protection using preexisting keys.

Referring now to FIG. 7, an example method 700 of providing MAC address protection is illustrated. Method 700 can be a method for providing protection of a machine access control (MAC) header of a frame. Method 700 can be implemented, using for example, systems 100 and 200, along with any features discussed in connection with FIGS. 1A-6. Method 700 can include acts 705-720. At 705, the method can include identifying a temporal key. At 710, the method can include computing a first key for a frame body and a second key for a frame header. At 715, the method can include encrypting body using the first key and the header using the second key. At 720, the method can include computing a first MIC for frame and a second MIC for header using the first and the second keys.

At 705, the method can include identifying a temporal key. The method can include the one or more processors of a sender device identifying a temporal key (TK) programmed in hardware. The TK can be, for example, stored in a storage device (e.g., non-volatile memory) or programmed in a specialized hardware module. TK can be generated during initialization of the sender device or during a negotiation or a handshake between the sender device and the receiver device. TK can be generated based on a master key negotiated between the sender and the receiver device during a startup or establishment of a connection or a session between these devices.

The sender device can identify or use the TK to encrypt frames at a machine access control (MAC) layer for wireless communications. For example, the one or more processors of the sender device can use the TK as an input into one or more cryptographic functions or algorithms, such as the AES, to generate one or more keys for encrypting one or more portions of a frame (e.g., a network packet). For example, the TK can be used to generate a body key for encrypting a body of a fame and a header key for encrypting a header of the frame. The header and the body keys can be customized or configured to cover the body and the header at any layer, including the data link or a MAC layer of the frame, such as a frame for a WLAN or Wi-Fi network.

At 710, the method can include computing a first key for a frame body and a second key for a frame header. The method can include the one or more processors of the sender device using the TK to compute a first key (e.g., a body key) for encrypting a body of a frame and a second key (e.g., a header key) for encrypting a header of the frame. In some implementations, the first key and the second key can be same. In some implementations, the second key can be different from the first key.

The method can include the one or more processors computing the first key using a hash-based message authentication code (HMAC) operation. The HMAC operation can include a first input of the TK and a first fixed pattern. The method can include computing the first key using a hash-based message authentication code (HMAC) operation or an AES Encryption operation using any of a first input of the TK and a first fixed pattern. The first pattern can include a string of characters. The string of characters can be a predetermined string of characters shared between the sender and the receiver devices. The method can include the one or more processors computing the second key using the HMAC operation with a second input of the TK and a second fixed pattern. The second fixed pattern can include a string of characters that can be shared between the sender and receiver devices. The first fixed pattern can include a packet number (PN) of a network packet of the frame and the second fixed pattern can include one or more characters of the body.

The one or more processors can include computing the first key for the body using an advanced encryption standard (AES) operation. The AES operation can include a first input of the TK and a first fixed pattern. The method can include the one or more processors computing the second key for the header of the frame. The second key for the header of the frame can be computed using the same AES operation with a second input of the TK and a second fixed pattern. The one or more processors can compute the second key for the header using the AES operation with a first input of the TK and a first fixed pattern and using the TK as the first key for the body of the frame.

At 715, the method can include encrypting body using the first key and the header using the second key. The method can include the one or more processors identifying one or more frames at the MAC layer to be encrypted for wireless communications. For instance, the sender device can identify a frame that was not successfully received by the receiver device. Responsive to determining that the frame was not received at the receiver, the sender device can identify the frame to resend to the receiver.

The method can include the one or more processors of the sender device encrypting the body of the one or more frames at the MAC layer using the first key (e.g., the body key). The method can include the one or more processors of the sender device encrypting the header of the one or more frames at the MAC layer using the second key (e.g., the header key). The method can include encrypting one or more values in one or more fields of the header that include a packet number identifying the frame of the header within a sequence of frames sent from the sender to the receiver.

The method can include generating an initialization vector (IV) for encryption. The IV can be generated using one or more parameters of the frame. The one or more parameters can include a packet number of the frame. The IV can be generated using a concatenation of the packet number (PN) with additional parameters such as a fixed pattern. This can result in a unique initialization vector for each frame, allowing for detection of frames whose headers were intercepted and tampered with by a third party (e.g., an attacker or a hacker). The IV can be derived from the header data itself. The IV can incorporate specific fields, such as the packet number and other header parameters to facilitate uniqueness and cryptographic strength in the initialization process. The method can use the IV to encrypt the body of the frame. The method can use the IV to encrypt the header of the frame.

At 720, the method can include computing a first MIC for frame and a second MIC for header using the first and the second keys. The method can include the one or more processors of the sender device computing, determining or generating a first message integrity code (MIC) of the encrypted frame. The first MIC of the frame can be computed, determined or generated using the first key (e.g., body key). The method can include the one or more processors computing, determining or generating a second MIC of a content of the header of the frame at the MAC layer using the second key.

The method can include the one or more processors transmitting the frame with the first MIC (e.g., MIC of the frame) and the second MIC (e.g., MIC of the header) to a receiver. The method can include the one or more processors causing the frame to be transmitted with the first MIC (e.g., MIC of the frame) and the second MIC (e.g., MIC of the header), via a transceiver of the sender device (e.g., a communication chain circuitry with an antenna configured for wireless transmissions). The frame and the receiver configured to determine integrity of the header of the frame based at least on the second MIC (e.g., MIC of the header). For example, the receiver device can include an integrity check function and a MIC engine that can generate an expected header MIC. The integrity check function of the receiver device can compare the expected header MIC with the MIC of the header received with the frame. If the MIC of the header matches the expected header MIC, the integrity check function can determine that the incoming frame has not been tampered with and may decrypt and process the frame and its payload (e.g., body).

The method can include the one or more processors generating a combined MIC from the first MIC (e.g., MIC of the frame) and the second MIC (e.g., MIC of the header). The frame can correspond to a beacon transmission. The combined MIC can include the first MIC and the second MIC can include a timestamp. For example, the second MIC can be a timestamp. The combined MIC can be based on or include at least a portion of the first MIC and at least a portion of the second MIC. The method can include the one or more processors transmitting the combined MIC to the receiver to determine the integrity of the frame. The combined MIC can be generated using any reversable operation. For example, the combined MIC can be generated using any one or more of: a concatenation of the first MIC and the second MIC, a bitwise exclusive OR (XOR) computation applied to the first MIC and the second MIC, or any bitwise reversable computation applied to the first MIC and the second MIC.

For example, the method can include the sender device computing the first MIC once, such as one time for a given body of data or a beacon. The method can include the sender computing the second MIC for every retransmission or beacon transmission. The second MIC can be combined with the first MIC on every transmission or re-transmission or beacon transmission, such as that first MIC is not updated for the transmission or beacons transmission, but the second MIC and/or the combined MIC is updated for each retransmission.

The method can include the receiver determining the integrity of the header and body by computing the expected first MIC using the expected second MIC and then verifying that the expected first MIC (of the body) is correct. For instance, the expected second MIC can be computed independently on the receiver using the same or similar process as the second MIC was generated at the sender. The receiver can compare the expected second MIC with the second MIC received with the frame. For instance, the sender can include the combined MIC with the frame transmission, where the combined MIC includes a combination of the first MIC and second MIC in the same space or portion of the frame. The receiver can be configured to verify the integrity of the incoming frame by computing the expected first MIC using the expected second MIC and then verifying that the expected first MIC (of the body) is correct. The header MIC can be assumed to be correct, and the body MIC can be used to verify the header MIC and determine that the header MIC is correct responsive to determining that the body MIC is correct.

The method can include using first fixed pattern that includes at least a portion of the content of the body. The second fixed pattern can include one or more of the packet number (PN) used for the body of a network packet of the frame. The PN of the body used in the fixed pattern can be used for all retransmissions of the frame. For instance, the first fixed pattern or the second fixed pattern can include the frame Type, such as information indicative of control frames that may have different key from management frames and data frames. The second fixed pattern can include one or more link addresses, such as link addresses for multi-link operations, in which the link can be used to transmit the frame. The PN can include one or more bytes. For instance, a PN of a single byte can be used with a first key or the second key. For instance, the second key can be derived based on a PN for the body that is longer than one byte and that can remain unchanged (e.g., pre-existing) for multiple retransmissions. The frame can correspond to a first network packet of a plurality of network packets. The first network packet can include a first packet number in the header of the frame. The method can include the one or more processors determining to resend the first network packet as a second network packet having a second packet number in a second header of a second frame of the second network packet. The second packet number can be different than the first packet number. The second network packet can uniquely identify the network packet to be sent from the sender device from any other network packet in the series of network packets being transmitted over a period of time.

The one or more processors can include computing, using the TK, a first key for a second body of the second frame of the second network packet and a second key for the second header of the second frame. The first key of the first network packet can be different than the first key of the second network packet. The first key for the second body of the second frame of the second network packet can be same as the first key for the body of the frame of the first network packet. The method can include the one or more processors identifying one or more frames at MAC layer to be encrypted for wireless communications. The method can include the one or more processors encrypting the frame of the second network packet at the MAC layer using the first key of the second body and the second key for the second header.

In an example, during a network communication exchange, when a retry of a transmission occurs (e.g., a second attempt to transmit data after an initial unsuccessful attempt), some MAC header fields can be altered by a malicious actor without authentication by the system. In some instances, the changed fields can be masked in Additional Authentication Data (AAD). This vulnerability can facilitate malicious attacks by unauthorized actors, such as when a hacker takes advantage of fragmented frames. For example, some of the affected fields can include the Power Save Bit, More Bit, and SPP/Aggregation. Both CCMP and GCMP can compute MICs based on chaining, such as by using Cipher Block Hashing (CBC MIC in CCMP) or GHASH for the last cipher block. It can be beneficial to compute the MIC based on the packet MIC that was originally calculated, providing authentication for the changed fields, since such a solution can be simple to compute within Short Interframe Space (SIFS) and can maintains a format that is consistent, and same or a similar to prior formats.

Aspects of technical solutions are directed to extending existing security mechanisms to reuse encryption keys for MAC header protection. The technical solutions minimize creation of additional hardware and firmware for MAC header protection. Current CCMP and GCMP mechanisms can be used or extended to integrate the MIC for MAC header protection without changing the frame format. This can reduce the space or architecture. If encryption is desired, the same keys can be used, with the frame carrying additional encrypted data. The technical solution can allow for a distinct IV to be generated using the PN. This approach can facilitate addressing challenges in the WLAN standards, such as 11bn deployments. A different set of keys can be used, taking advantage of space/fields for encrypted header field information, which can be utilized in Wi-Fi communications to provide a balance between higher security and lower cost.

The technical solutions can take advantage of CCMP and GCMP functionalities, which can be used as in their prior configurations or infrastructure. For instance, a system can be configured to not include encryption of frame body 232 when retransmitting network packets (e.g., frames 230). The technical solutions can include key K 214 for MHP (MAC header Protection). Key K 210 can be derived from original key K (e.g., TK 212) used for transmissions. For example, key K can be defined as $K=E(K_{orig}, P1)$ or $E(K_{orig}, P1)\|E(K_{orig}, P2)$ where P1 and P2 are fixed patterns, such as $12345\|0^{\wedge}123$, $UHR\|0^{\wedge}125$.

For example, in a GCMP configuration of the solution, if no encryption is used, K can be same $K_{orig}$. H can be the seed hash for GHASH $H=E(K, P1)$ where P1 is a fixed pattern. Technical solutions can transmit MIC original CCMP/GCMP T which can be XOR'd (e.g., processed with exclusive OR) with MHP T (e.g., header MIC 244) which can be computed over the header 234 as MIC for the transmission. The technical solutions can use the same PN and perform the replay check as in prior system implementations.

In some examples, if a re-try of the transmission (e.g., retransmission) is to be encrypted or tested for MIC before the entire frame 230, the solutions can transmit MHP IV with retry number—small PN, send an encrypted block with the small PN also, or on decrypt determine that retry is unique—using the small PN. In some examples, the technical solutions can compute MHP T (e.g., header MIC 244) and XOR the MHP T with the received information (e.g., previously transmitted common key 210). The result can be the original T, which can allow for comparison and determining the integrity of the transmission. The technical solutions can use original CCMP/GCMP decryption and replay check can verify if MHP was replayed.

At a high level, a key derivation process can be extended to derive K-MHP (K MAC header Protection), whereas in some implementations only a K-Body can be utilized. The encryption and integrity protection can be achieved through Authenticated Encryption with Associated Data (AEAD) and can remain consistent for the body, with IV-Body, C-Body, and T-Orig components. In some examples, header encryption can be performed, and header integrity can be protected. This can involve, for example, IV-Header, C-Header, and T-Header elements. The transmitted or received frame after protection, where the Frame Check Sequence (FCS) is not shown, can include the following structure:

<<Header>[<IV-Header>[<C-Header>]]<T-Header><IV-Body><C-Body><T-Orig>

<Header>[<IV-Header>[<C-Header>]]<IV-Body><C-Body>(<T-Orig>⊕<T-Header>)

<Header><IV-Body><C-Body>(<T-Orig>⊕<T-Header>)

In the process of key derivation, the process of key derivation can include the concatenation of several components, including key confirmation key (KCK), key encryption key (KEK), temporal key (TK), and key derivation key (KDK). Such a concatenation can be performed using the hash-based message authentication code using key derivation function (HMAC-KDF-NNN) function with the pairwise master key (PMK) as the input keying material. The function parameters can include "Pairwise key expansion" as the info parameter, and various combinations of values derived from AA (Authentication Algorithm), SPA (Selected Pairwise Algorithm), ANONCE (Authentication Nonce), and SNONCE (Supplicant Nonce). These values can be manipulated and passed into the HMAC-KDF-NNN function to generate the derived keys. The process can be expressed as:

KCK∥KEK∥TK∥KDK=HMAC-KDF-NNN(PMK, "Pairwise key expansion", MIN(AA, SPA)∥MAX(AA, SPA)∥MIN(ANONCE, SNONCE)∥MAX(ANONCE, SNONCE))

In one example, the technical solutions can include TK 212 that can serve as K-Body (e.g., body key 214), with no K-Header present. In one aspect, technical solutions can include a TK 212 as a combination of K-Header (e.g., header key 216) and K-Body (e.g., body key 214). In one aspect, technical solutions can include the derivation of K-Header and K-Body through HMAC-KDF-NNN that can utilize one or more distinct fixed patterns. For instance, K-Header can be determined using HMAC-KDF-NNN(TK, FixedPattern1), K-Body can be determined as HMAC-KDF-NNN (TK, FixedPattern2). In one aspect, technical solutions can include: K-Header=AES(TK, FixedPattern3), K-Body=AES (TK, FixedPattern4); 0123^0128 for FixedPattern3 and 0128 for FixedPattern4; "Header" for FixedPattern1 and "Body" for FixedPattern2.

In one aspect, the technical solutions can include PMK not being exposed to hardware, utilizing the existing AES engine in hardware, using different keys for improved security, and using temporal key programming in hardware. In one aspect, technical solutions can use AES-based derivation for K-Header and TK for K-Body, utilizing a pattern. For example, the solution can utilize a feature that can be expressed as: K-Header=AES(TK, FixedPattern5), K-Body=TK; 0123^0128 for FixedPattern5.

With respect to transmission and receiving, in some aspects, IV-Header and C-Header can be used. IV Header can allow MIC check and replay check before processing body. For example, C-Header can provide header encryption fields and/or obfuscation. In some examples, standalone T-Header can be included. Technical solutions can allow MIC check and replay check before processing body. In some aspects, a combined header can be used with no or minimal changes to frame format. For instance, T-header can be used to compute T-Orig, and an existing process can be used to validate T-Orig. The current replay check can be used to trust the Header, and results can be in <Header><Body> as output.

General security considerations can provide a preference to prevent security attacks and minimize the number of keys involved. For instance, counter/IV may not be the same, but keys can be the same. Masked fields can be authenticated. In some examples, the fields may not be encrypted. The replay checks may or may not occur. The encrypted payload may not be re-encrypted. MAC header protection can be combined with MPDU encryption to reduce additional key material. The technical solution may include no changes to CCMP/GCMP.

CCMP can include M representing MAC length, which can be 8 or 16 octets. Ke can be a key of 16, 24 or 32 octets. MIC key can be an encryption key. For instance, technical solutions can use E(K,P1), E(K,P1)∥E(K,P2) as 128 bits and 256 bits K of MHP CCMP. The P1 and P2 are fixed patterns e.g.: $54321∥0^{123}$, $12345∥0^{123}$. For example, the technical solution can include configurations, such as:

Si:=E(K, Ai) for i=0, 1, 2, . . . ; Ai=<FLAGS: 1><NONCE:13><Block Counter i:2>, which can represent the encryption of data blocks (Ai) using a key (K) in a sequence, where each block Ai can include parameters, such as flags, a nonce, and a block counter, that can be combined to form the input for encryption.

X1:=E(K, B0); B0 is CCM Flags, length(AAD), AAD (last block 0-padded), P; Xi+1:=E(K, Xi⊕Bi) for i=1, . . . , n, which can denote the encryption process for the CCM (Counter with CBC-MAC) mode, involving encrypting the initial block (B0) using a key (K) and then iteratively encrypting subsequent blocks (Xi) by XORing them with the previous block (Bi) before encryption.

Code:=L(Xn+1, M); T1/ICV=Auth Tag:=Auth Code⊕L (S0, M), which can denote an authentication code (Auth Code) computed based on the last encrypted block (Xn+1) and the length of the message (M). This code can be combined with a derived value (S0) to generate the ICV or Auth Tag.

Plaintext: P; Ciphertext: $Ci=Si+1\oplus Pi$, which can indicate the transformation of plaintext (P) into ciphertext (Ci) using the above encryption process, where each block of ciphertext is derived by XORing the corresponding block of plaintext with the output of the encryption function.

The technical solutions can include transmission from the sender device 202 to the receiver device 204 that can be represented as: A (IV), C (Ciphertext), T1 (ICV). For instance, A (IV) can refer to the IV used for encryption, C (Ciphertext) can denote the encrypted message or data, and T1 (ICV) can indicate the integrity check value (ICV), or authentication tag associated with the encrypted frame.

Galois/Counter Mode Protocol (GCMP) can include a cryptographic protocol used for secure communication, such as in wireless networks, and provides encryption and integrity protection for data frames. GCMP can include configurations, such as:

$H=E(K, 0^{128})$; Hash key is 0-block encrypted with key; the 0-block can include another chosen one for H, such as $54321\|0^{123}$. For example, the technical solutions can use E(K,P1), E(K,P1)||E(K,P2) as 128 bits and 256 bits K of MHP GCMP. The P1 and P2 can be fixed patterns, such as $54321\|0^{123}$, $12345\|0^{123}$.

$Y0=IV\|0^{31}$ if len(IV)=96 or GHASH(H, { }, IV) otherwise; Yi=incr (Yi–1), which can indicate initialization of counter values (Yi) used in the encryption process. If the length of the initialization vector (IV) is 96 bits, Y0 can be formed by concatenating IV with 32 bits of value of 0. Otherwise, it can be computed using the GHASH function with the hash key (H) and the IV, with subsequent counter values (Yi) being derived by incrementing the previous counter.

$Ci=Pi\oplus E(K, Yi)$ for i=1, . . . , n —; $C^*=P^*\oplus MSB(E(K, Yn))$—last block, which can represent the encryption process in GCMP, where each block of ciphertext (Ci) is obtained by XORing the corresponding plaintext block (Pi) with the output of encrypting the counter value (Yi) using the encryption key (K). The last block of ciphertext (C*) can be derived similarly, with an additional XOR operation involving the most significant bits of the encryption output.

T1=MSB(GHASH(H, A, C)$\oplus$E(K, Y0)), which can correspond to a determination of the integrity check value (T1) or authentication tag for the transmitted data. It can include the GHASH function, which computes a hash value based on the hash key (H), associated data (A), and ciphertext (C). The bits of this hash value can then be combined with the output of encrypting the initial counter value (Y0) to generate the final authentication tag.

The technical solutions can then transmit from the sender device 202 to the receiver 204, as expressed by: A (IV), C (Ciphertext), T1 (ICV).

Technical solutions can include separate MHP keys. For example, technical solutions can insert MHP header protected by MHP keys. For instance, Packet X can include MHP||MHPX||BX||TX. For instance, packet Y can include MHY (Changed MHX)|MHPY||B2|T2. For example, packet*=MHY||MHPY|BX||TX. Changed header protection can be and coupling between MHPHX and TX may be used. The technical solution can include parallel mechanisms for HW key state, replay check state, algorithm negotiation and key rotation.

Technical solutions can construct octet counter D0 . . . Dk–1. For example, AES block size is 16 octets, keys are 16, 24 or 32 octets. For example, 4 Octet/MHP prefix or zeros in D0– can be used for validation of T2 before T1. For example, A2||PN (Original)||<changed fields>—the last provide counter uniqueness. For instance, A2, PN, Changeable fields can be already in the frame. PN may be reused, but counter value may not be used for security.

For example, technical solution can include configuration, such as: T2=E(K, D)$\oplus$T1 (D is one block) CCMP, or T2=E(K, E(K, D1)+D0)$\oplus$T1 . . . , for longer D CCMP, or T2=GHASH(H, { }, D)$\oplus$T1 for GCMP. On reception, for example, T1=E(K, D)$\oplus$T2 (one block D) CCMP and Decrypt ~IV||C||T1 as before. Technical solution can transmit: ~A (IV), C (Ciphertext), T2 (ICV). Trust changed fields only after decrypting C and validating T1.

For example, technical solutions can include advertising of MAC header Protection (MHP) in RSNXE. For instance, beacons, probe responses, association and 4-WAY M2/M2 can be used. Bit can be assigned (e.g., 15 is the maximum). UHR can use MHP. The key can be reused. Validation Order can include Validate T1 and then only trust Header fields that may have changed and included in T2 computation. For example, if MHP replay detect is to be done first, transmit prefix and E(K, D) first and check for replay before processing the full frame that uses current protection (CCMP, GCMP). Replay checks can be combined.

For example, technical solutions can include validating T2 and changed fields prior to validating T1. For instance, the solution can change the frame format by including another field, e.g., MAC Security Header. Another set of keys may or may not be used, just as the original PN, which can get validated later. There may be more bits for payload and one bit can be used to set up so that the counter is not reused (e.g., multicast bit in A2).

The technical solution can include multiple advantages. For example, the technical solutions can maintain a consistent frame format without incorporating a MAC header Protection (MHP) header. The number of unicast keys can be unchanged, and the coupling of the MHP header with the tag from body encryption can be emphasized for security. Without this coupling, there can be a vulnerability where the MHP header of one frame could be mixed with the body of another, leading to a loss of protection for changed header fields. The same key, metadata algorithm, and Packet Number (PN) can be intended to be used with MHP, with no alterations to protocols like the 4-way handshake. To enhance security, there is no extra replay check and the corresponding transmission and reception state for MHP keys; the Operating Channel Validation (OCV) feature may assist in eliminating multi-channel Man-in-the-Middle (MITM) attacks. The technical solutions introduce minimal changes to current protocols and supports both CCMP and GCMP. Security weaknesses are minimized by chaining blocks using the same key, akin to the approach in CCMP and GCMP.

In some implementations, the technical solutions can include enhancements to beacon frame protection mechanisms within wireless networks, including improvements involving key derivation, frame format, and message integrity. The technical solutions can include using Cipher-based Message Authentication Code (CMAC) or Galois/Counter Code (GMAC) techniques along with advanced encryption standard (AES) encryption to provide the integrity and authenticity of beacon frames. Key derivation can be used to provide a shared beacon integrity protection (BIP) key distribution during association or handshake process and can be used for encryption and computation of message authentication codes (MACs). The frame format adjustments can include a management MIC element (MME) including CMAC or GMAC tags alongside timestamp fields (TSF) that can be carried within beacons. The technical solutions can involve updates to the MME, replacing the existing MIC element with an AES encrypted block derived from the timestamp and key, improving security against tampering. Hash functions or keyed hash functions can be used for validation of timestamps within beacon frames, facilitating improved data integrity and authenticity in wireless communication processes.

A TSF, such as a timestamp element, can be included in the solution. CMAC or GMAC can be leveraged within the Beacon Integrity Protection (BIP) framework. BIP can be used to compute the MIC sent to MME. CMAC and GMAC can each use AES encryption or Galois Hash (GHASH) to secure beacon frames. The technical solution can involve replacing the existing BIP mechanism with an encrypted AES block.

Challenges can include negotiation of the key, including situations in which the key is kept unchanged and backward compatibility in which a new element carries the MIC with the TSF. Also, computation on every TTBT may be avoided as well as computing T and updating incrementally of MIC with T and TSF.

In some examples, frame format can include MME that can include CMAC tag T of 8 or 16 bytes or GMAC of 16 bytes. MME can be a management MIC element. TSF can include 8 bytes timestamp field. TSF can be carried in Beacons. Authentication tag for T/MIC can be included. For BIP-GMAC the tag can be 128 bits or 16 bytes. For BIP-CMAC, it can be 8 bytes for BPI-CMAC-128 or 16 bytes for BIP-CMAC-256. T can be computed once for the beacon. TSF can change for every beacon and may not be included in T.

The technical solution can involve key derivation. Same BIP key K can be used for encryption. For instance, the same BIP (Beacon Integrity Protection) Key, denoted as K, can be used for both encryption and cryptographic operations such as CMAC (Cipher-based Message Authentication Code) or GMAC (Galois/Counter Mode) to compute the Message Integrity Code (MIC). Such key, K, can be distributed as part of the association or 4-way handshake procedure. For instance, key K can serve a dual purpose to facilitate secure encryption of data and the computation of MICs to verify the integrity and authenticity of transmitted messages.

In the frame format specifications, the Management MIC Element (MME) can include either an 8 or 16-byte CMAC tag or a 16-byte GMAC tag. The MME can serve as the management component responsible for integrity checking within the frame. The frame can include an 8-byte Timestamp Field (TSF) and can be carried within beacon frames. Current authentication tag or the Message Integrity Code (MIC), in the context of BIP (Beacon Integrity Protection) with GMAC, the tag can be set to 128 bits or 16 bytes. In the case of BIP-CMAC, the tag length can vary, such as having 8 bytes allocated for BIP-CMAC-128 and 16 bytes for BIP-CMAC-256. Tag (T) can be computed once for each beacon frame. The Timestamp Field (TSF) can change with every beacon and may be, or may be not, included in the computation of Tag.

The technical solutions can include modifications or updates to the Management MIC Element (MME) using an AES encrypted block. For instance, Timestamp Field (TSF) found within beacon frames, can serve as the timestamp, with the notation ⊕ representing XOR operations. For example, within the MME's MIC field, the same timestamp element can be encapsulated. The encryption process can include applying AES encryption using key K to the XOR operation between the Tag and a padded version of the TSF appended with zeros, resulting in a fixed-size AES block of 16 bytes. TSF can be padded to T size with 0s. Then XOR function can be applied with T and result can be padded with 0s to one AES block. Then it can be encrypted using K to generate one encrypted block.

Upon reception, the encrypted block can be decrypted using key K to retrieve T⊕(TSF∥0*). The estimated tag (T) can be obtained using the TSF extracted from the beacon frame. Subsequently, the estimated T can undergo cryptographic validation using the conventional Beacon Integrity Protection (BIP) mechanism. The validation can fail if TSF/Timestamp in beacon frame has been tampered with or modified.

The technical solution can also update the Management MIC Element (MME) using an additional hash function, denoted as H, or a keyed hash function, represented as KH (e.g., CMAC, GMAC, SHA*). The Timestamp Field (TSF) can serve as the timestamp within beacon frames, with the XOR notation ⊕. Within the MIC field of the MME, the same timestamp element can be included. The process can involve concatenating the timestamp (T) with the TSF. Such a process can include or be followed by the computation of either H(T∥TSF) or KH(K, T∥TSF). Such a computation can generate a new value, T2, which can subsequently be transmitted in place of T within the MIC. Upon reception, the recipient can employ the existing BIP mechanism to retrieve T using key K. T can then be concatenated with the TSF from the beacon frame, and the expected T2 can be computed using either H or KH. The received T2 from the MME can be compared with the expected T2, and acceptance can occur if they match; otherwise, the frame can be rejected. Encryption can be implemented as 802.11 hardware can include AES compatibility.

In some implementations, actors that are familiar with the BIP key can send beacon or impersonate the AP with the MIC as defined. Some considerations can include using a public and private key pair to sign, where the MIC in MME (e.g., element) can be the signature. For instance, the signature for EC NIST P256 can include 64 bytes. Considerations can include sending additional element AIMIC, avoiding impersonation MIC with the public key signature, so that the impersonation can be avoided with anyone with the BIP key. Considerations can include replacing MIC or have the new MIC covering AIMIC with AES and/or hash of the AMIC⊕(TSF∥0*)∥0* to avoid updating the public key signature at every TBTT/Beacon interval to check that TSF/Timestamp is also verified.

The technical solutions can include improvements regarding MAC header Protection (MHP), involving key derivation and frame format. With respect to the key derivation, the technical solutions can include usage of a single key (TK) programmed to hardware, from which K-Header and K-Body can be derived. MHP can be used for MAC header protection, such that the current solution can use IV-body, including a current security header (IV) for the frame (body) and IV-header can be added, defined and used. This approach can streamline key management and reduce hardware memory features. The frame formatting can include combined MIC, IV-Header, and ICV-Header configurations, with considerations for header protection, body decryption, and integrated MIC support. Straw polls can be conducted to gauge support for these proposed enhancements, addressing key derivation methods, frame format preferences, and the use of IV-Body for indicating MHP and ICV configurations.

For instance, MHP can be used for MAC header protection including improvements to key derivation and frame format. In terms of the frame format, there can be options such as a fixed format, either with combined MIC or with initialization vector for the header (IV-Header) and integrity check value for the header (ICV-Header) (MIC). Smaller PN for the header can be used and indications in the IV-Body reserved field, such as 1 byte, can be utilized. Additional authentication data (AAD) for ICV-Header can include packet number original (PN-Orig), although it's noted that a smaller PN may not support header encryption.

Key derivation can involve more or less agreement with different keys. Using the same key can be implemented, but it may involve additional work to specify, for example, due to different counter constructions. One key can be programmed to hardware, aiming to prevent an increase in hardware memory for keys on access points. For instance, a single TK can be programmed to hardware, and both K-Body and K-Header can be derived using a single AES (ECB) operation, leveraging existing hardware support for AES. K-Body and K-Header can be derived and programmed to hardware. The Pairwise Master Key (PMK) may not leave the supplicant/authenticator, and hardware may not support hash computation.

In the frame format, an example (e.g., option A) can include <Header>, <IV-Body>, <C-Body>, and a combined ICV/MIC. The short packet number (PN) for the header can potentially change for the same body PN. The header key can be computed using a larger PN from the IV-Body, with the formula K_header=AES(TK, ("Header"||<fc>||<Body PN||j>)|| . . . ). The Body PN can be represented in little endian format, unlike the nonce, and the key for the Body, K_body, can be computed similarly using AES (e.g., AES (TK, "Body"||<j>)|| . . . ). The header replay check can use a 7-byte PN, concatenating the body PN with the short PN. Format options and short PN can be carried in reserved bits in the body-IV. The combined ICV can be computed by XORing the ICV-Header and ICV-Body. Header Additional Authentication Data (AAD) can include various parameters, but some, like fc and seq, can be masked in the body AAD. The header nonce can include A2 concatenated with the Short PN.

For example, (e.g., in option B), <Header>, <IV-Body>, <C-Body>, and optional <IV-Header> and <ICV-Header><ICV-Body> can be included. This option can allow for the separation of IV Header and IV Body, with the IV Header defined with larger, separate PN or Time Stamp Field (TSF) as needed, without encrypting any part of the header protection.

In an example, k_body can be left unchanged, so k_body is, or acts, as a TK. For example, <fc> may be not used in K_header. For example, <Body PN> in k_header can make a different header key for each frame. In some examples, K_header can derive the header key only once per TK. For example, If <Body PN> is not bound to header MIC/ICV, malicious users can obstruct and mix two frames, such as <i, j> frame with header PN i and body PN j: <1,1>, <2,2> transmitted, while the malicious user obstructs and sends <1,2>. For example, if integrated MIC is not used, <1,1> can be sent, but a malicious user can intercept and send <1, 1 with body changed>. If body MIC is not verified before acting on the header MIC, the sender state can conflict with the receiver state. For example, technical solutions can provide body PN binding using different ways. For example, technical solutions can implement K_header=AES(TK, ("Header"<j>)|| . . . . For example, technical solutions can use minor variant of GCM (which is used by 11be) with Header Nonce. For example, technical solutions can include or use A2||<Body PN>||<one byte short PN>||<Block Counter>. Short PN can be new; Block counter can be 3 bytes as opposed to 4 bytes in standard GCM. There can be up to 2-to-power (**) 24, 16 byte blocks in what can be protected. As headers can be small, different frames can have the same short PN but different Body PNs. Current IV can be used as specified elsewhere herein.

The technical solution can include the implementation of combined integrated ICV that may use body decryption before the acknowledgment (ACK) can be issued. This process can be implementation-dependent, but certain implementations can be undertaken and can be utilized accordingly. For instance, the ACK procedure may not include completion of body processing. The robust security network exchange (RSNXE) could advertise support for integrated MIC with MAC header Protection (MHP), such as when both communication endpoints support this feature. The existing IV-Body reserved bits can serve as indicators of the frame format in use.

The header ICV computation can include computing the header additional authentication data (AAD) without masking, along with calculating the header nonce using a standard nonce format with either a short PN or a packet number (PN) from an optional IV-header. The header integrity check value (ICV) can be computed using the CCMP/GCMP MAC algorithm, incorporating the header key, header nonce, header AAD, and null data. Regarding the MHP Bits, a value of 0x20 in IV-Body[3] can indicate the use of MAC header Protection (MHP), while can 0x80 denote the utilization of an Integrated Message Integrity Code (MIC). When the Integrated MIC is used, the absence of a set bit can indicate that the IV-Header and ICV-Header are separate. The short PN can be represented by IV-Body[2] when the integrated MIC is used.

The technical solutions can include or use strawpolls. A strawpoll can include one or more inquiries about various aspects of the protocol. Firstly, in Strawpoll I, a poll or survey can involve a question on whether there is support for programming one key (TK) to hardware, from which both K-Header and K-Body can be derived. Participants can be given options to vote "Yes," "No," or "Abstain." For example, in Strawpoll II a focus can be on whether the frame format supports integrated Integrity Check Value (ICV). Again, participants can choose "Yes," "No," or "Abstain." For example, in Strawpoll III, the use of the IV Body to advertise the usage of MAC header Protection (MHP), Integrated ICV, shorter Header Packet Number (PN), and the presence of IV-Header, can be queried. Similarly, participants can respond with "Yes," "No," or "Abstain."

In one example, the Message Integrity Code (MIC) can be retained in its current form, while transmitting a modified version using AES encryption. Specifically, the transmission can include encrypting the MIC XORed with the Timestamp Field (TSF) using a specified key. Upon reception, the recipient can decrypt the encrypted MIC and utilizes the TSF, or timestamp extracted from the Beacon to access the MIC and verify it, akin to the current process. This AES operation can be done with each Beacon, which can help reduce processing of the entire Beacon and compute the MIC repetitively.

When an element is referred to herein as being "connected" or "coupled" to another element, it is to be understood that the elements can be directly connected or coupled the other element, or have intervening elements present between the connected or coupled elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first substrate and a second substrate) temporally or according to a sequence, although in some cases, these entities can include such a relationship. Nor do these terms limit the number of possible entities (e.g., delay circuit, filter, peak detector) that can operate within a system or environment. It should be understood that the systems described above can provide multiple ones of any or each of those components and these components can be provided on either a stand-alone structure or device or, in some embodiments, on multiple structures or devices in a distributed system.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system, comprising:
one or more processors coupled with memory to:
compute, using a temporal key (TK) programmed in hardware, a first key for a body of a frame and a second key for a header of the frame, the second key different from the first key;
encrypt the body of the frame at a machine access control (MAC) layer using the first key and the header of the frame at the MAC layer using the second key;
compute a first message integrity code (MIC) of the encrypted frame using the first key and a second MIC of a content of the header of the frame at the MAC layer using the second key; and
transmit the frame with the first MIC and the second MIC to a receiver, the receiver configured to determine integrity of the header of the frame based at least on the second MIC.

2. The system of claim 1, comprising the one or more processors to:
generate a combined MIC from the first MIC and the second MIC; and
transmit the combined MIC to the receiver to determine the integrity of the frame.

3. The system of claim 2, wherein the combined MIC is generated using a reversable operation applied to the first MIC and the second MIC, wherein the reversable operation comprises at least one of: a concatenation of the first MIC and the second MIC or a bitwise exclusive OR (XOR) computation applied to the first MIC and the second MIC.

4. The system of claim 2, wherein the combined MIC is generated using one of: a concatenation of the first MIC and the second MIC, a bitwise exclusive OR (XOR) computation applied to the first MIC and the second MIC.

5. The system of claim 1, comprising the one or more processors to:
compute the first key using at least one of a hash-based message authentication code (HMAC) operation or an advanced encryption standard (AES) encryption operation with a first input of the TK and a first fixed pattern; and
computing the second key using the HMAC operation with a second input of the TK and a second fixed pattern.

6. The system of claim 5, wherein the first fixed pattern includes at least a portion of a content of the body of the frame and the second fixed pattern includes a packet number (PN) of the body of the frame, a type of the frame or a link address for a multi-link communication.

7. The system of claim 1, wherein the frame corresponds to a first network packet of a plurality of network packets, the first network packet including a first packet number in the header of the frame, the system comprising the one or more processors to:
determine to resend the first network packet as a second network packet having a second packet number in a second header of a second frame of the second network packet, the second packet number different than the first packet number; and
compute, using the TK, a first key for a second body of the second frame of the second network packet and a second key for the second header of the second frame, the first key of the first network packet different than the first key of the second network packet.

8. The system of claim 7, wherein the first key for the second body of the second frame of the second network packet is same as the first key for the body of the frame of the first network packet, the system comprising the one or more processors to:
identify one or more frames at the MAC layer to be encrypted for wireless communications; and
encrypt the second frame of the second network packet at the MAC layer using the first key of the second body and the second key for the second header.

9. The system of claim 1, comprising the one or more processors to:
determine, during an exchange over a wireless network between a device comprising the one or more processors and a receiver, a pairwise master key (PMK); and
generate the temporal key (TK) using the PMK.

10. The system of claim 1, wherein the receiver is further configured to determine the integrity of the header based on a verification of integrity of the header using the second MIC prior to decrypting the frame.

11. The system of claim 1, comprising the one or more processors to:
include the second MIC in the header of the frame; and
transmit the frame with the second MIC included in the header of the frame.

12. The system of claim 1, comprising the one or more processors to compute at least one the first key or the second key using an Advanced Encryption Standard (AES) algorithm and at least one of the first MIC or the second MIC using at least one of a Cipher Block Chaining-MAC Protocol (CCMP) or a Galois/Counter Mode Protocol (GCMP).

13. The system of claim 1, wherein the receiver is configured to verify the integrity of the header of the frame using the second MIC prior to processing the body of the frame.

14. A method for providing protection of a machine access control (MAC) header of a frame, the method comprising:

identifying, by one or more processors, a temporal key (TK) programmed in hardware to encrypt frames at a machine access control (MAC) layer for wireless communications;

computing, by the one or more processors using the TK, a first key for encrypting a body of a frame and a second key for encrypting a header of the frame, the second key different from the first key;

identifying, by the one or more processors, one or more frames at the MAC layer to be encrypted for wireless communications;

encrypting, by the one or more processors, the body of the one or more frames at the MAC layer using the first key and the header of the one or more frames at the MAC layer using the second key;

computing, by the one or more processors, a message integrity code (MIC) using the second key; and transmitting, by the one or more processors, the MIC to a receiver, the receiver configured to determine integrity of the header of the frame based at least on the MIC.

15. The method of claim 14, comprising:

computing, by the one or more processors, another MIC of the encrypted frame using the first key; and transmitting, by the one or more processors, the frame with the MIC and the other MIC to the receiver, the receiver configured to determine integrity of the header of the frame based at least on the MIC and integrity of the body of the frame based at least on the other MIC.

16. The method of claim 14, further comprising:

computing, by the one or more processors, the first key using at least one of a hash-based message authentication code (HMAC) operation or an advanced encryption standard (AES) encryption with a first input of the TK and a first fixed pattern; and computing, by the one or more processors, the second key using the HMAC operation with a second input of the TK and a second fixed pattern, wherein the first fixed pattern includes at least a portion of a content of the body of the frame and the second fixed pattern includes a packet number (PN) of the body of the frame, a type of the frame or a link address for a multi-link communication.

17. The method of claim 14, wherein the frame corresponds to a first network packet of a plurality of network packets, the first network packet including a first packet number in the header of the frame, the method comprising:

determining, by the one or more processors, to resend the first network packet as a second network packet having a second packet number in a second header of a second frame of the second network packet, the second packet number different than the first packet number;

computing, by the one or more processors using the TK, the first key for a second body of the second frame of the second network packet and the second key for the second header of the second frame, the first key of the first network packet different than the first key of the second network packet, wherein the first key for the second body of the second frame of the second network packet is same as the first key for the body of the frame of the first network packet;

identifying, by the one or more processors, one or more frames at MAC layer to be encrypted for wireless communications; and encrypting, by the one or more processors, the second frame of the second network packet at the MAC layer using the first key of the second body and the second key for the second header.

18. The method of claim 14, comprising:

computing, by the one or more processors, the first key for the body using an advanced encryption standard (AES) operation with a first input of the TK and a first fixed pattern and computing the second key for the header of the frame using the same AES operation with a second input of the TK and a second fixed pattern; and computing, by the one or more processors, the second key for the header using the AES operation with a first input of the TK and a first fixed pattern and using the TK as the first key for the body of the frame.

19. The method of claim 14, comprising:

generating an initialization vector (IV) for encryption based on a parameter of the frame; and using the IV to encrypt the body of the frame.

20. A system, comprising:

one or more processors coupled with memory to:

identify a temporal key (TK) programmed in hardware to encrypt frames at a machine access control (MAC) layer for wireless communications;

compute, using the TK, a first key for encrypting a body of a frame and a second key for encrypting a header of the frame, the second key different from the first key;

identify one or more frames at the MAC layer to be encrypted for wireless communications;

encrypt the body of the one or more frames at the MAC layer using the first key and the header of the one or more frames at the MAC layer using the second key;

compute a message integrity code (MIC) using the second key; and transmit the MIC to a receiver, the receiver configured to determine integrity of the header of the frame based at least on the MIC.

\* \* \* \* \*